(12) United States Patent
Otsuki et al.

(10) Patent No.: US 11,539,047 B2
(45) Date of Patent: Dec. 27, 2022

(54) POSITIVE ELECTRODE AND LITHIUM ION SECONDARY BATTERY

(71) Applicant: TDK CORPORATION, Tokyo (JP)

(72) Inventors: Keitaro Otsuki, Tokyo (JP); Tetsu Sato, Tokyo (JP); Masahiro Saegusa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 107 days.

(21) Appl. No.: 16/295,801

(22) Filed: Mar. 7, 2019

(65) Prior Publication Data
US 2019/0280295 A1 Sep. 12, 2019

(30) Foreign Application Priority Data

Mar. 12, 2018 (JP) .............................. JP2018-044308
Mar. 12, 2018 (JP) .............................. JP2018-044309
Dec. 25, 2018 (JP) .............................. JP2018-241197

(51) Int. Cl.
*H01M 4/525* (2010.01)
*H01M 4/131* (2010.01)
(Continued)

(52) U.S. Cl.
CPC .......... *H01M 4/525* (2013.01); *H01M 4/131* (2013.01); *H01M 4/133* (2013.01); *H01M 4/505* (2013.01);
(Continued)

(58) Field of Classification Search
CPC ............ H01M 4/02; H01M 4/13; H01M 4/14; H01M 4/24; H01M 4/64; H01M 2004/021;
(Continued)

(56) References Cited

U.S. PATENT DOCUMENTS 6,083,642 A * 7/2000 Kato ...................... C01G 51/04
429/218.1
2002/0195591 A1 12/2002 Ravet et al.
(Continued)

FOREIGN PATENT DOCUMENTS

JP 2002-110254 A 4/2002
JP 2003034538 A * 2/2003
(Continued)

OTHER PUBLICATIONS

Umeyama, Hiroya; "A Lithium Ion Negative Electrode for Secondary Battery"; Patent Description Translated, obtained from ESpacenet (Year: 2017).*
(Continued)

*Primary Examiner* — Allison Bourke
*Assistant Examiner* — Charlene Bermudez
(74) *Attorney, Agent, or Firm* — Oliff PLC

(57) ABSTRACT

A positive electrode includes a positive electrode current collector, and a positive electrode active material layer that is provided on the positive electrode current collector and that includes a positive electrode active material, a conductive auxiliary agent, and a binder. A surface of the positive electrode active material layer has a reflectance Rc in a range of $2.0 \leq Rc \leq 12.0\%$ at a wavelength of 550 nm. A lithium ion secondary battery includes: the positive electrode; a negative electrode including a negative electrode current collector and a negative electrode active material layer that is provided on the negative electrode current collector and that includes a negative electrode active material; a separator; and a nonaqueous electrolyte solution. A surface of the negative electrode active material layer has a reflectance Ra in a range of $7.5 \leq Ra \leq 16.0\%$ at a wavelength of 550 nm.

19 Claims, 1 Drawing Sheet

(51) Int. Cl.
*H01M 4/505* (2010.01)
*H01M 4/133* (2010.01)
*H01M 4/583* (2010.01)
*H01M 10/0525* (2010.01)
*H01M 10/0569* (2010.01)
*H01M 4/02* (2006.01)

(52) U.S. Cl.
CPC ....... *H01M 4/583* (2013.01); *H01M 10/0525* (2013.01); *H01M 10/0569* (2013.01); H01M 2004/021 (2013.01); H01M 2004/027 (2013.01); H01M 2004/028 (2013.01)

(58) Field of Classification Search
CPC ....... H01M 2004/028; H01M 10/0525; H01M 10/052; H01M 4/525; H01M 4/52; H01M 4/50; H01M 4/505; H01M 10/0583; H01M 10/0585; H01M 10/0587; H01M 2300/0065; H01M 2300/0025; H01M 2300/0017; H01M 4/362; H01M 4/382; H01M 4/386; H01M 4/134; H01M 4/133; H01M 4/364; H01M 4/663; H01M 4/483; H01M 4/485; H01M 4/582; H01M 4/1315; H01M 4/131; H01M 4/136; H01M 4/581; H01M 4/583; H01M 4/5835; H01M 4/587; H01M 2004/027; H01M 4/625; H01M 4/139; H01M 2220/20; B82Y 30/00; B82Y 20/00; G01N 21/55; G01N 21/551; G01N 21/555; G01N 21/556; G01N 21/557; G01N 21/558; G01N 21/57; G01N 21/59; G01N 21/31; G01N 21/47; G01N 2021/4735; G01N 2021/5903; G01N 2003/425

See application file for complete search history.

(56) References Cited

U.S. PATENT DOCUMENTS

| | | |
|---|---|---|
| 2004/0086445 A1 | 5/2004 | Armand et al. |
| 2011/0032541 A1* | 2/2011 | Yamada ............. G01B 11/0625 356/630 |
| 2012/0276421 A1 | 11/2012 | Aihara et al. |
| 2012/0311852 A1 | 12/2012 | Onoda et al. |
| 2015/0030931 A1* | 1/2015 | Takahata ............... H01M 4/133 427/547 |
| 2015/0093633 A1 | 4/2015 | Miyabara et al. |
| 2016/0248115 A1* | 8/2016 | Hatta ................. H01M 10/056 |
| 2017/0263979 A1* | 9/2017 | Han ................. H01M 10/0431 |

FOREIGN PATENT DOCUMENTS

| | | | |
|---|---|---|---|
| JP | 2004509058 A | | 3/2004 |
| JP | 2015-092462 A | | 5/2015 |
| JP | 2017068915 A | * | 4/2017 |
| WO | 2011/092990 A1 | | 8/2011 |
| WO | 2011/104843 A1 | | 9/2011 |

OTHER PUBLICATIONS

Sho Furutsuki, Sai-Cheong Chung, Shin-ichi Nishimura, Yusuke Kudo, Koichi Yamashita, Atsuo Yamada; "Electrochromism of LixFePO4 Induced by Intervalence Charge Transfer Transition"; The Journal of Physcial Chemistry, Jun. 2012 (Year: 2012).*

Kazuhiro et al; "JP2003034538A Method for Producing Lithium Nickel Manganese Complex Oxide"; ESpacenet Machine Translation of JP 2003034538 A (Year: 2003).*

Umeyama; "JP2017068915A Lithium Ion Negative Electrode for Secondary Battery"; ESpacenet Machine Translation of JP 2017068915 A (Year: 2017).*

Sigma-Aldrich; "Photometry & Reflectometry"; https://www.sigmaaldrich.com/US/en/applications/analytical-chemistry/photometry-and-reflectometry (Year: 2021).*

Sigma-Aldrich; "Transmittance to Absorbance Table" (Year: 2021).*

Jan. 12, 2022 Office Action issued in Chinese Patent Application No. 201910185164.9.

May 10, 2022 Office Action issued in Japanese Patent Application No. 2018-241197.

* cited by examiner

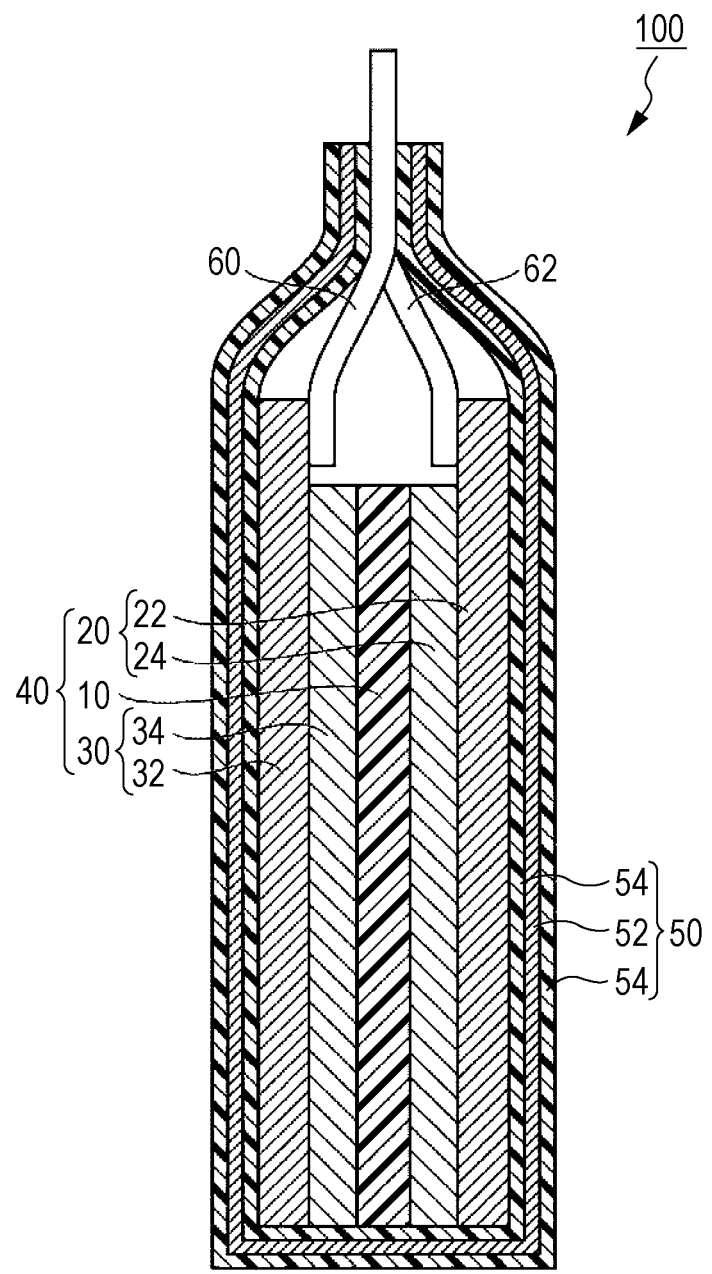

POSITIVE ELECTRODE AND LITHIUM ION SECONDARY BATTERY

CROSS-REFERENCE TO RELATED APPLICATION

This application claims priority from Japanese Patent Application Nos. 2018-044308 and 2018-044309 filed on Mar. 12, 2018, and 2018-241197 filed on Dec. 25, 2018, with the Japan Patent Office, the entire contents of which are hereby incorporated by reference.

BACKGROUND ART

1. Technical Field

The present disclosure relates to a positive electrode and a lithium ion secondary battery.

2. Related Art

In recent years, home-use electric appliances have rapidly become portable and cordless. In accordance with this, nonaqueous electrolyte secondary batteries have been put into practical use as the power source for small electronic appliances, such as lap-top computers, mobile phones, and video cameras. The nonaqueous electrolyte secondary battery includes a positive electrode, a negative electrode, a separator, and a nonaqueous electrolyte. Research and development of lithium cobaltate ($LiCoO_2$) as a positive electrode active material used in the positive electrode have been intensively advanced and many suggestions have been made so far.

For example, JP-A-H-8-236114 has suggested a lithium secondary battery including a positive electrode in which lithium-transition metal composite oxide is used as an active material. In this lithium secondary battery, a film formed of BeO, MgO, CaO, SrO, BaO, ZnO, $Al_2O_3$, $CeO_2$, $As_2O_3$, or a mixture of two or more kinds selected from these is provided on a surface of the positive electrode.

In another example, JP-A-H-11-16566 describes a technique regarding a battery that can be charged and discharged reversibly a plurality of times. This battery includes a negative electrode, a positive electrode, and a nonaqueous electrolyte including lithium salt. In the positive electrode and the battery including the same, which are suggested in this literature, the positive electrode is covered with metal including at least one kind selected from Ti, Al, Sn, Bi, Cu, Si, Ga, W, Zr, B, and Mo and/or an intermetallic compound obtained by a combination of a plurality of elements described above and/or oxide thereof.

On the other hand, a nonaqueous electrolyte secondary battery including lithium cobaltate in a positive electrode active material, there is a limit in capacity (in the status quo, 140 mAh/g or less is the use limit). In addition, cobalt, which is one constitution element, is rare metal and expensive. For these reasons, this secondary battery also has significant problems in terms of stable supply and cost.

A nonaqueous electrolyte secondary battery including lithium nickelate instead of lithium cobaltate as the positive electrode active material has attracted attention (see JP-A-H-9-219199). Lithium nickelate is obtained by substituting cobalt of lithium cobaltate with nickel. By the use of this lithium nickelate, a capacity as high as about 190 mAh/g is achieved. In addition, since nickel, which is a constituent element thereof, is rich, this secondary battery is economically advantageous. Thus, the practical application of this secondary battery has been highly expected.

One of the conventional problems of lithium nickelate is the low thermal stability. However, through the recent research and development, the thermal stability has been improved largely in a way that a small quantity of element such as aluminum is added to lithium nickelate (see JP-A-H-11-135123).

On the other hand, a lithium ion secondary battery including a phosphate compound as a positive electrode active material with excellent thermal stability has attracted attention. It is reported that this secondary battery exhibits a high battery characteristic. A typical example of the phosphate compound is lithium iron phosphate ($LiFePO_4$). In addition, lithium manganese phosphate ($LiMnPO_4$) that operates at higher voltage has also been developed (see, for example, Canadian Patent No. 2270771, and JP-T-2004-509058).

SUMMARY

A positive electrode includes a positive electrode current collector, and a positive electrode active material layer that is provided on the positive electrode current collector and that includes a positive electrode active material, a conductive auxiliary agent, and a binder. A surface of the positive electrode active material layer has a reflectance Rc in a range of $2.0 \leq Rc \leq 12.0\%$ at a wavelength of 550 nm.

BRIEF DESCRIPTION OF THE DRAWINGS

FIG. 1 is a schematic cross-sectional view of a lithium ion secondary battery according to one embodiment.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The methods according to the conventional technique have failed to achieve the characteristics that the lithium ion secondary batteries have been required to have. Among these characteristics, the charging rate characteristic and the load discharging characteristic have been expected to improve further.

An object of the present disclosure is to provide a positive electrode that can improve the charging rate characteristic and the load discharging characteristic, and a lithium ion secondary battery including the positive electrode.

As a result of earnest studies, the present inventors have found out that the high charging rate characteristic and load discharging characteristic can be achieved when the positive electrode includes a positive electrode current collector, and a positive electrode active material layer that is provided on the positive electrode current collector and that includes a positive electrode active material, a conductive auxiliary agent, and a binder, and a surface of the positive electrode active material layer has a reflectance Rc in a predetermined range at a wavelength of 550 nm.

That is, a positive electrode according to a first aspect includes a positive electrode current collector, and a positive electrode active material layer that is provided on the positive electrode current collector and that includes a positive electrode active material, a conductive auxiliary agent, and a binder. A surface of the positive electrode active material layer has a reflectance Rc in a range of 2.0≤Rc≤12.0% at a wavelength of 550 nm.

By setting the reflectance Rc of the surface of the positive electrode active material layer to be within the predetermined range, the charging rate characteristic and the load discharging characteristic are improved. Although the mechanism is unclear, it is supposed that the reflectance Rc of the surface of the positive electrode active material layer reflects the flatness of the surface of the positive electrode active material layer and the surface compressed state of the positive electrode active material on the surface of the positive electrode active material layer.

That is to say, it is estimated that when the flatness of the surface of the positive electrode active material layer is controlled, the reaction field with the electrolyte solution on the surface of the positive electrode active material layer is increased; accordingly, the high charging rate characteristic is achieved.

In addition, it is considered that when the surface of the positive electrode active material on the surface of the positive electrode active material layer is compressed, excessive impregnation of the surface of the positive electrode active material with the electrolyte solution is suppressed and the high reactivity and side reaction are both suppressed; accordingly, the high load discharging characteristic is achieved.

Various methods are given as a method of controlling the reflectance Rc of the surface of the positive electrode active material layer at a wavelength of 550 nm to be within a particular range. For example, this reflectance Rc can be varied by changing the pressure and the number of times of pressing the electrode, and the heating condition in the pressing.

In addition, it is considered that the charging rate characteristic and the load discharging characteristic are similarly improved when the reflectance Rc of the surface of the positive electrode active material layer is controlled to be within the predetermined range independently of the surface compressed state of the positive electrode active material layer.

Regarding this point, it is supposed that when the reflectance Rc of the surface of the positive electrode active material layer is controlled to be within the predetermined range, the side reaction on the surface of the positive electrode active material layer is suppressed and the permeability of the electrolyte solution into the positive electrode active material layer from the surface of the positive electrode active material layer is improved, and therefore the charging rate characteristic and the load discharging characteristic are improved.

In another example of controlling the reflectance Rc of the surface of the positive electrode active material layer at a wavelength of 550 nm to be within the particular range, the surface of the rolled electrode is polished, or top coating is applied on the surface of the rolled electrode.

In the positive electrode according to the first aspect, the positive electrode active material may contain a compound expressed by the following formula (1) as a main component:

$$Li_xNi_yM_{1-y}O_z \tag{1}$$

(where x, y, and z satisfy 0<x≤1.1, 0≤y<0.5, and 1.9≤z≤2.1, and M includes at least one kind selected from Co, Mn, Al, Fe, and Mg), and the surface of the positive electrode active material layer may have a reflectance Rc1 in the range of 8.0≤Rc1≤12.0% at a wavelength of 550 nm.

When the positive electrode in which the positive electrode active material contains the compound expressed by the above general formula (1) as the main component has the reflectance Rc1 in the above range, the charging rate characteristic can be improved further.

In the positive electrode according to the above aspect, the positive electrode active material layer may have a density dc1 in the range of 3.1≤dc1≤4.1 g/cm³.

In the positive electrode according to the above aspect, the positive electrode active material layer may have a supporting quantity Lc1 per unit area in the range of 13.0≤Lc1≤25.0 mg/cm².

In the positive electrode according to the first aspect, the positive electrode active material may contain a compound expressed by the following formula (2) as a main component:

$$Li_xNi_yM_{1-y}O_z \tag{2}$$

(where x, y, and z satisfy 0<x≤1.1, 0.5≤y≤1, and 1.9≤z≤2.1, and M includes at least one kind selected from Co, Mn, Al, Fe, and Mg), and the surface of the positive electrode active material layer may have a reflectance Rc2 in the range of 3.5≤Rc2≤7.8% at a wavelength of 550 nm.

When the positive electrode in which the positive electrode active material contains the compound expressed by the above general formula (2) as the main component has the reflectance Rc2 in the above range, the load discharging characteristic can be improved further.

In the positive electrode according to the above aspect, the positive electrode active material layer may have a density dc2 in the range of 3.0≤dc2≤3.8 g/cm³.

In the positive electrode according to the above aspect, the positive electrode active material layer may have a supporting quantity Lc2 per unit area in the range of 12.0≤Lc2≤24.0 mg/cm².

In the positive electrode according to the first aspect, the positive electrode active material may contain a compound expressed by the following formula (3) as a main component:

$$Li_xM_yO_zPO_4 \tag{3}$$

(where x, y, and z satisfy 0<x≤1.1, 0<y≤1.1, and 0≤z≤1.0, and M includes at least one kind selected from Ni, Co, Mn, Al, Fe, Mg, Ag, and V), and the surface of the positive electrode active material layer may have a reflectance Rc3 in the range of 2.0≤Rc3≤5.8% at a wavelength of 550 nm.

When the positive electrode in which the positive electrode active material contains the compound expressed by the above general formula (3) as the main component has the reflectance Rc3 in the above range, the charging rate characteristic can be improved further.

In the positive electrode according to the above aspect, the positive electrode active material layer may have a density dc3 in the range of 1.8≤dc3≤2.5 g/cm³.

In the positive electrode according to the above aspect, the positive electrode active material layer may have a supporting quantity Lc3 per unit area in the range of 8.0≤Lc3≤15.0 mg/cm².

A lithium ion secondary battery according to a second aspect includes: any of the positive electrodes according to the first aspect; a negative electrode including a negative electrode current collector and a negative electrode active material layer that is provided on the negative electrode current collector and that includes a negative electrode active material; a separator; and a nonaqueous electrolyte solution. A surface of the negative electrode active material layer has a reflectance Ra in the range of 7.5≤Ra≤16.0% at a wavelength of 550 nm.

When the positive electrode according to the first aspect is combined with the negative electrode in which the reflectance Ra of the surface of the negative electrode active material layer is adjusted to be within the predetermined range, the charging rate characteristic and the load discharging characteristic are improved further.

It is considered that the reflectance Ra of the surface of the negative electrode active material layer also reflects the flatness of the surface of the negative electrode active material layer and the surface compressed state of the negative electrode active material on the surface of the negative electrode active material layer, in a manner similar to the reflectance Rc of the surface of the positive electrode active material layer.

Therefore, it is estimated that by combining the positive electrode according to the first aspect with the negative electrode in which the reflectance Ra of the surface of the negative electrode active material layer is in the range of 7.5≤Ra≤16.0%, the charging rate characteristic and the load discharging characteristic of the lithium ion secondary battery including this positive electrode are improved.

In the lithium ion secondary battery according to the second aspect, the ratio of the reflectance Rc1 of the surface of the positive electrode active material layer to the reflectance Ra of the surface of the negative electrode active material layer, Rc1/Ra, may be in the range of 1.00<Rc1/Ra≤1.53.

In the lithium ion secondary battery according to the second aspect, the ratio of the reflectance Rc2 of the surface of the positive electrode active material layer to the reflectance Ra of the surface of the negative electrode active material layer, Rc2/Ra, may be in the range of 0.29≤Rc2/Ra<1.00.

In the lithium ion secondary battery according to the second aspect, the ratio of the reflectance Rc3 of the surface of the positive electrode active material layer to the reflectance Ra of the surface of the negative electrode active material layer, Rc3/Ra, may be in the range of 0.13≤Rc3/Ra≤0.75.

In the above structure, the lithium ion secondary battery according to the second aspect has the excellent charging rate characteristic. It is estimated that this is because the impregnation with the electrolyte solution and the suppression of the side reaction on the surface of the positive electrode active material layer and the surface of the negative electrode active material layer are both achieved and lithium ions are exchanged suitably.

It is understood that the preferred ratio between the reflectance Rc of the positive electrode active material layer and the reflectance Ra of the surface of the negative electrode active material layer is different depending on the reflectance of the surface of the positive electrode active material and the positive electrode active material layer to be used.

It is estimated that this is because the reaction state with the electrolyte solution on the surface of the positive electrode is different for each positive electrode active material, and moreover the preferred state of the surface of the positive electrode for the impregnation of the inside of the positive electrode with the electrolyte solution is different for each positive electrode active material.

In the lithium ion secondary battery according to the second aspect, the negative electrode active material may contain a carbon material with a graphite structure.

In the case where the negative electrode active material in the negative electrode with the reflectance in the above range contains the carbon material with the graphite structure, the lithium ion secondary battery according to the second aspect has the particularly excellent charging rate characteristic.

It is estimated that this is because the carbon material with the graphite structure does not excessively decrease the deintercalation and intercalation sites for lithium ions on the surface of the negative electrode active material layer and thus, both the impregnation with the electrolyte solution and the suppression of the side reaction can be achieved.

In the lithium ion secondary battery according to the second aspect, the nonaqueous electrolyte solution may include a nonaqueous solvent and an electrolyte, the nonaqueous solvent may contain ethylene carbonate, and the ethylene carbonate may be contained in the range of 10 to 30 vol. % in the entire nonaqueous solvent.

In the above structure, the lithium ion secondary battery according to the second aspect has the excellent charging rate characteristic. It is estimated that this is because ethylene carbonate, which is partially decomposed on the surface of the electrode to become a film component, is not decomposed excessively and the excellent film can be formed.

As thus described, according to the first aspect and the second aspect, the positive electrode for a lithium ion secondary battery that can improve the charging rate characteristic and the load discharging characteristic, and the lithium ion secondary battery including the positive electrode can be provided.

The present embodiment will hereinafter be described in detail with reference to the drawings. For the convenience, the drawings to be used in the following description may magnify a characteristic part in order to clarify the characteristic in the present disclosure. Therefore, the size, the ratio, and the like of the elements in these drawings may be different from the actual ones. The materials, the size, and the like shown in the description are mere examples, and the technique according to the present disclosure is not limited to these examples. Within the range that does not depart from the concept, various changes are possible.

(Lithium Ion Secondary Battery)

FIG. 1 is a schematic cross-sectional view of a lithium ion secondary battery according to the present embodiment. A lithium ion secondary battery 100 illustrated in FIG. 1 mainly includes a stacked body 40, a case 50 that houses the stacked body 40 in a sealed state, and a pair of leads 60 and 62 that is connected to the stacked body 40. In addition, a nonaqueous electrolyte that is not shown is housed in the case 50 with the stacked body 40.

The stacked body 40 includes a positive electrode 20 and a negative electrode 30 that are disposed to face each other with the separator 10 interposed therebetween. The positive electrode 20 includes a positive electrode current collector 22 with a plate shape (film shape) and a positive electrode active material layer 24 that is provided on the positive electrode current collector 22. The negative electrode 30 includes a negative electrode current collector 32 with a plate shape (film shape) and a negative electrode active material layer 34 that is provided on the negative electrode current collector 32.

The positive electrode active material layer 24 is in contact with one side of the separator 10 and the negative electrode active material layer 34 is in contact with the other side of the separator 10. The positive electrode current collector 22 has its end connected to the lead 62, and the negative electrode current collector 32 has its end connected to the lead 60. The leads 60 and 62 have their ends extended out of the case 50. In the example illustrated in FIG. 1, one stacked body 40 is provided in the case 50; however, a plurality of stacked bodies may be provided alternatively.
(Positive Electrode)

The positive electrode 20 includes the positive electrode current collector 22, and the positive electrode active material layer 24 that is provided on the positive electrode current collector 22.

The positive electrode according to the present embodiment includes the positive electrode current collector, and the positive electrode active material layer that is provided on the positive electrode current collector and that includes the positive electrode active material. A surface of the positive electrode active material layer has the reflectance Rc in the range of $2.0 \leq Rc \leq 12.0\%$ at a wavelength of 550 nm.

First Embodiment

A positive electrode according to a first embodiment includes a positive electrode current collector, and a positive electrode active material layer that is provided on the positive electrode current collector and that includes a positive electrode active material. The positive electrode active material mainly contains a compound expressed by the following general formula (1). In addition, a surface of the positive electrode active material layer has the reflectance Rc1 in the range of $8.0 \leq Rc1 \leq 12.0\%$ at a wavelength of 550 nm.

$$Li_x Ni_y M_{1-y} O_z \tag{1}$$

In this formula, x, y, and z satisfy $0 < x \leq 1.1$, $0 \leq y < 0.5$, and $1.9 \leq z \leq 2.1$. M includes at least one kind selected from Co, Mn, Al, Fe, and Mg.

In the positive electrode according to the first embodiment, the surface of the positive electrode active material layer has the reflectance Rc1 particularly preferably in the range of $9.5 \leq Rc1 \leq 10.5\%$ at a wavelength of 550 nm.

When the reflectance Rc1 of the surface of the positive electrode active material layer is in the above range, the charging rate characteristic becomes particularly excellent.

It is considered that when the reflectance Rc1 is in the above range, the effect of achieving both the suppression of excessive impregnation of the surface of the positive electrode active material layer with the electrolyte solution and the suppression of the high reactivity and the side reaction can be achieved the most.

In the positive electrode according to the first embodiment, the positive electrode active material layer preferably has the density dc1 in the range of $3.1 \leq dc1 \leq 4.1$ g/cm³. In addition, the positive electrode active material layer more preferably has the density dc1 in the range of $3.3 \leq dc1 \leq 3.9$ g/cm³, more preferably in the range of $3.5 \leq dc1 \leq 3.7$ g/cm³.

In the positive electrode according to the first embodiment, the positive electrode active material layer preferably has the supporting quantity Lc1 per unit area in the range of $13.0 \leq Lc1 \leq 25.0$ mg/cm².

In the positive electrode according to the present embodiment, the positive electrode active material layer has the porosity Pc1 preferably in the range of $21.0 \leq Pc1 \leq 25.0\%$, more preferably $23.0 \leq Pc1 \leq 24.0\%$.

In the positive electrode according to the first embodiment, it is more preferable that the density dc1 of the positive electrode active material layer and the porosity Pc1 of the positive electrode active material layer are in the aforementioned preferable range.

It is considered that when dc1 and Pc1 of the positive electrode active material layer are both in the above preferable range, both the suppression of excessive impregnation with the electrolyte solution and the suppression of the high reactivity and the side reaction can be achieved and additionally, the effect of diffusing the electrolyte solution in the positive electrode active material layer is increased, so that the high charging rate characteristic is achieved.
(Positive Electrode Active Material)

As the positive electrode active material, which is the compound expressed by the above general formula (1), for example, lithium-containing transition metal oxide mainly containing Ni, Mn, and Co, typified by $LiNi_{1/3}Mn_{1/3}Co_{1/3}O_2$ and $LiNi_{0.2}Co_{0.8}O_2$, can be used. In addition, as the positive electrode active material, which is the compound expressed by the above general formula (1), for example, lithium-containing transition metal oxide typified by $LiCoO_2$ can be used.

Among these examples, lithium-containing transition metal oxide typified by $LiCoO_2$ and $LiNi_{1/3}Mn_{1/3}Co_{1/3}O_2$ is preferably used as the positive electrode active material.

The above lithium-containing transition metal oxide is preferable because the structure is highly stable, the synthesis is easy, and the sufficient charging rate characteristic can be achieved.

Note that the positive electrode active material expressed by general formula (1) does not need to have the oxygen quantity of the stoichiometric composition expressed by this formula, and widely includes materials with oxygen deficiency. That is to say, the positive electrode active material expressed by general formula (1) also includes materials that are identified to have the same composition system by X-ray diffraction or the like.

Therefore, in addition to the positive electrode active material expressed by general formula (1), a material in which a part of Ni or M in general formula (1) is replaced by a different element may be used. The positive electrode active material may contain the elements with gradient concentration, or at least a part of the surface of the positive electrode active material may be covered with oxide, carbon, or the like.

The positive electrode active material layer according to the first embodiment may mainly contain the positive electrode active material expressed by the above general formula (1), and may contain other positive electrode active materials with different compositions.

The positive electrode active materials with the different compositions include lithium nickelate ($LiNiO_2$), lithium manganate ($LiMnO_2$), lithium manganese spinel ($LiMn_2O_4$), and composite metal oxide expressed by general formula: $LiNi_x Co_y M_z O_2$ ($x+y+z=1$, $0.5 \leq x < 1$, $0 \leq y < 1$, $0 \leq z < 1$, M is one or more kinds of elements selected from Al, Mg, Nb, Ti, Cu, Zn, and Cr). In addition, the positive electrode active materials with the different compositions include composite metal oxide such as a lithium vanadium compound ($LiVOPO_4$, $Li_3V_2(PO_4)_3$, $LiV_2O_5$, $Li_2VP_2O_7$), olivine type $LiMPO_4$ (where M represents one or more kinds of elements selected from Co, Ni, Mn, Fe, Mg, Nb, Ti, Al, Zr, and V), and lithium titanate ($Li_4Ti_5O_{12}$). Furthermore, the positive electrode active materials with the different compositions include the existing positive electrode active material that can intercalate and deintercalate lithium ions, such as polyacetylene, polyaniline, polypyrrole, polythiophene, and polyacene.

The positive electrode active material according to the first embodiment contains as the main component, the positive electrode active material, which is the compound expressed by the above general formula (1). This means that the content of the positive electrode active material, which is the compound expressed by the above general formula (1), in the entire positive electrode active material is more than 50 mass %.

In a case where the positive electrode active material layer according to the first embodiment contains the positive electrode active material with the composition different from the composition of the positive electrode active material expressed by the above general formula (1), the content of the positive electrode active material expressed by the above general formula (1) in the total of the positive electrode active material expressed by the above general formula (1) and the positive electrode active materials with the different compositions is preferably 60 mass % or more, more preferably 80 mass % or more, and particularly preferably 95 mass % or more.

Second Embodiment

A positive electrode according to a second embodiment includes a positive electrode current collector, and a positive electrode active material layer including a positive electrode active material that is provided on the positive electrode current collector and that includes a positive electrode active material. The positive electrode active material contains a compound expressed by the following Formula (2) as a main component. In addition, a surface of the positive electrode active material layer has the reflectance Rc2 in the range of $3.5 \leq Rc2 \leq 7.8\%$ at a wavelength of 550 nm.

$$Li_xNi_yM_{1-y}O_z \quad (2)$$

In this formula, x, y, and z satisfy $0 < x \leq 1.1$, $0.5 \leq y \leq 1$, and $1.9 \leq z \leq 2.1$. M includes at least one kind selected from Co, Mn, Al, Fe, and Mg.

In the positive electrode according to the second embodiment, the surface of the positive electrode active material layer has the reflectance Rc2 particularly preferably in the range of $4.3 \leq Rc2 \leq 6.3\%$ at a wavelength of 550 nm.

When the reflectance Rc2 of the surface of the positive electrode active material layer is in the above range, the load discharging characteristic becomes particularly excellent.

It is considered that when the reflectance Rc2 is in the above range, the effect of achieving both the suppression of excessive impregnation of the surface of the positive electrode active material layer with the electrolyte solution and the suppression of the high reactivity and the side reaction can be achieved the most.

In the positive electrode according to the second embodiment, the positive electrode active material layer preferably has the density dc2 in the range of $3.0 \leq dc2 \leq 3.8$ g/cm$^3$, more preferably in the range of $3.2 \leq dc2 \leq 3.6$ g/cm$^3$.

In the positive electrode according to the second embodiment, the positive electrode active material layer preferably has the supporting quantity Lc2 per unit area preferably in the range of $12.0 \leq Lc2 \leq 15.0$ mg/cm$^2$.

In the positive electrode according to the second embodiment, the positive electrode active material layer has the porosity Pc2 preferably in the range of $21.0 \leq Pc2 \leq 25.0\%$, more preferably $23.0 \leq Pc2 \leq 24.5\%$.

In the positive electrode according to the second embodiment, it is more preferable that the density dc2 of the positive electrode active material layer and the porosity Pc2 of the positive electrode active material layer are in the aforementioned preferable range.

It is considered that when dc2 and Pc2 of the positive electrode active material layer are both in the above preferable range, both the suppression of excessive impregnation with the electrolyte solution and the suppression of the high reactivity and the side reaction can be achieved and additionally, the effect of diffusing the electrolyte solution in the positive electrode active material layer is increased, so that the high load discharging characteristic is achieved.

(Positive Electrode Active Material)

As the positive electrode active material, which is the compound expressed by the above general formula (2), for example, lithium-containing transition metal oxide mainly containing Ni and Co, typified by $LiNi_{0.8}Co_{0.2}O_2$ and $LiNi_{0.85}Co_{0.10}Al_{0.05}O_2$, can be used. In addition, as the positive electrode active material, which is the compound expressed by the above general formula (2), for example, lithium-containing transition metal oxide mainly containing Ni, Co and Mn typified by $LiNi_{0.8}Mn_{0.1}Co_{0.1}O_2$ and $LiNi_{0.6}Mn_{0.2}Co_{0.2}O_2$ can be used.

Among these examples, lithium-containing transition metal oxide having a part of Ni or Co replaced by Al, which is expressed by $LiNi_{0.85}CO_{0.10}Al_{0.05}O_2$, and lithium-containing transition metal oxide containing Ni in large quantity, which is expressed by $LiNi_{0.8}Mn_{0.1}Co_{0.1}O_2$ and $LiNi_{0.6}Mn_{0.2}Co_{0.2}O_2$, are preferably used. Thus, the high discharging capacity can be achieved.

Note that the positive electrode active material expressed by general formula (2) does not need to have the oxygen quantity of the stoichiometric composition expressed by this formula, and widely includes materials with oxygen deficiency. That is to say, the positive electrode active material expressed by general formula (2) also includes materials that are identified to have the same composition system by X-ray diffraction or the like.

Therefore, in addition to the positive electrode active material expressed by general formula (2), a material in which a part of Ni or M in general formula (2) is replaced by a different element may be used. The positive electrode active material may contain the elements with gradient concentration, or at least a part of the surface of the positive electrode active material may be covered with oxide, carbon, or the like.

The positive electrode active material layer according to the second embodiment may mainly contain the positive electrode active material expressed by the above general formula (2), and may contain other positive electrode active materials with different compositions.

The positive electrode active materials with the different compositions include lithium cobaltate ($LiCoO_2$), lithium manganate ($LiMnO_2$), lithium manganese spinel ($LiMn_2O_4$), and composite metal oxide expressed by general formula: $LiNi_xCo_yM_zO_2$ (x+y+z=1, $0 \leq x < 0.5$, $0.5 \leq y < 1$, $0 \leq z < 1$, M is one or more kinds of elements selected from Al, Mg, Nb, Ti, Cu, Zn, and Cr). In addition, the positive electrode active materials with the different compositions include composite metal oxide such as a lithium vanadium compound ($LiVOPO_4$, $Li_3V_2(PO_4)_3$, $LiV_2O_5$, $Li_2VP_2O_7$), olivine type $LIMPO_4$ (where M represents one or more kinds of elements selected from Co, Ni, Mn, Fe, Mg, Nb, Ti, Al, Zr, and V), and lithium titanate ($Li_4Ti_5O_{12}$). Furthermore, the positive electrode active materials with the different compositions include the existing positive electrode active material that can intercalate and deintercalate lithium ions, such as polyacetylene, polyaniline, polypyrrole, polythiophene, and polyacene.

The positive electrode active material according to the second embodiment contains as the main component, the positive electrode active material, which is the compound expressed by the above general formula (2). This means that the content of the positive electrode active material, which is the compound expressed by the above general formula (2), in the entire positive electrode active material is more than 50 mass %.

In a case where the positive electrode active material layer according to the second embodiment contains the positive electrode active material with the composition different from the composition of the positive electrode active material expressed by the above general formula (2), the content of the positive electrode active material expressed by the above general formula (2) in the total of the positive electrode active material expressed by the above general formula (2) and the positive electrode active materials with the different compositions is preferably 60.0 mass % or more, more preferably 80.0 mass % or more, and particularly preferably 95.0 mass % or more.

Third Embodiment

A positive electrode according to a third embodiment includes a positive electrode current collector, and a positive electrode active material layer that is provided on the positive electrode current collector and that includes the positive electrode active material. The positive electrode active material mainly contains a compound expressed by the following general formula (3). In addition, a surface of the positive electrode active material layer has the reflectance Rc3 in the range of 2.0≤Rc3≤5.8% at a wavelength of 550 nm.

$$Li_xM_yO_zPO_4 \qquad (3)$$

In this formula, x, y, and z satisfy 0<x≤1.1, 0<y≤1.1, and 0≤z≤1.0. M includes at least one kind selected from Ni, Co, Mn, Al, Fe, Mg, Ag, and V.

In the positive electrode according to the third embodiment, the surface of the positive electrode active material layer has the reflectance Rc3 particularly preferably in the range of 3.2≤Rc3≤4.9% at a wavelength of 550 nm.

When the reflectance Rc3 of the surface of the positive electrode active material layer is in the above range, the load discharging characteristic becomes particularly excellent.

It is considered that when the reflectance Rc3 is in the above range, the effect of achieving both the suppression of excessive impregnation of the surface of the positive electrode active material layer with the electrolyte solution and the suppression of the high reactivity and the side reaction can be achieved the most.

In the positive electrode according to the third embodiment, the positive electrode active material layer preferably has the density dc3 in the range of 1.8≤dc3≤2.5 g/cm³, more preferably in the range of 1.9≤dc3≤2.3 g/cm³.

In the positive electrode according to the third embodiment, the positive electrode active material layer preferably has the supporting quantity Lc3 per unit area in the range of 12.0≤Lc3≤15.0 mg/cm².

In the positive electrode according to the third embodiment, the positive electrode active material layer has the porosity Pc3 preferably in the range of 21.0≤Pc3≤25.0%, more preferably 23.0≤Pc3≤24.5%.

In the positive electrode according to the third embodiment, it is more preferable that the density dc3 of the positive electrode active material layer and the porosity Pc3 of the positive electrode active material layer are in the aforementioned preferable range.

It is considered that when dc3 and Pc3 of the positive electrode active material layer are both in the above preferable range, both the suppression of excessive impregnation with the electrolyte solution and the suppression of the high reactivity and the side reaction can be achieved and additionally, the effect of diffusing the electrolyte solution in the positive electrode active material layer is increased, so that the high load discharging characteristic is achieved.

(Positive Electrode Active Material)

As the positive electrode active material, which is the compound expressed by the above general formula (3), for example, a phosphate compound with an olivine structure typified by LiFePO₄ and LiMnPO₄, can be used. In addition, as the positive electrode active material, which is the compound expressed by the above general formula (3), for example, solid solution of a phosphate compound expressed by $LiFe_xMn_{1-x}PO_4$ (0<x<1) and a phosphate compound expressed by LiVOPO₄ can be used.

Note that the positive electrode active material expressed by general formula (3) does not need to have the oxygen quantity of the stoichiometric composition expressed by this formula, and widely includes materials with oxygen deficiency. That is to say, the positive electrode active material expressed by general formula (3) also includes materials that are identified to have the same composition system by X-ray diffraction or the like.

Therefore, in addition to the positive electrode active material expressed by general formula (3), a material in which a part of M or P in general formula (3) is replaced by a different element may be used. The positive electrode active material may contain the elements with gradient concentration, or at least a part of the surface of the positive electrode active material may be covered with oxide, carbon, or the like.

The positive electrode active material layer according to the third embodiment may mainly contain the positive electrode active material expressed by the above general formula (3), and may contain other positive electrode active materials with different compositions.

The positive electrode active materials with the different compositions include lithium cobaltate (LiCoO₂), lithium manganate (LiMnO₂), lithium manganese spinel (LiMn₂O₄), and composite metal oxide expressed by general formula: $LiNi_xCo_yM_zO_2$ (x+y+z=1, 0≤x≤1.0, 0≤y<1, 0≤z<1, M is one or more kinds of elements selected from Al, Mg, Nb, Ti, Cu, Zn, and Cr). In addition, the positive electrode active materials with the different compositions include composite metal oxide such as a lithium vanadium compound (LiV₂O₅, Li₂VP₂O₇), nasicon type $Li_3M_2(PO_4)_3$ (where M represents one or more kinds of elements selected from V, Fe, and Mo), a phosphate compound expressed by Li₂MP₂O₇ (where M represents one or more kinds of elements selected from Co, Ni, Mn, Fe, Mg, Nb, Ti, Al, Zr, and V), and lithium titanate (Li₄Ti₅O₁₂). Furthermore, the positive electrode active materials with the different compositions include the existing positive electrode active material that can intercalate and deintercalate lithium ions, such as polyacetylene, polyaniline, polypyrrole, polythiophene, and polyacene.

The positive electrode active material according to the third embodiment contains as the main component, the positive electrode active material, which is the compound expressed by the above general formula (3). This means that the content of the positive electrode active material, which is the compound expressed by the above general formula (3), in the entire positive electrode active material is more than 50 mass %.

In a case where the positive electrode active material layer according to the third embodiment contains the positive electrode active material with the composition different from the composition of the positive electrode active material expressed by the above general formula (3), the content of the positive electrode active material expressed by the above general formula (3) in the total of the positive electrode active material expressed by the above general formula (3) and the positive electrode active materials with the different compositions is preferably 60.0 mass % or more, more preferably 70.0 mass % or more, and particularly preferably 80.0 mass % or more.

The content of each positive electrode active material in the positive electrode active material layer according to the present embodiment can be calculated by identifying the kind of contained compounds through the X-ray diffraction measurement and subsequently examining the content of each element through elementary analysis.

The positive electrode active material layer according to the present embodiment may include members such as a conductive auxiliary agent and a binder in addition to the positive electrode active material.

(Conductive Auxiliary Agent)

Examples of the conductive auxiliary agent include carbon powder of carbon blacks and the like, carbon nanotube, carbon materials, micropowder of metal such as copper, nickel, stainless steel, and iron, a mixture of a carbon material and metal micropowder, and conductive oxide such as ITO.

(Binder)

The binder binds the active materials together, and binds the active material and the current collector 22 to each other. The binder may be any binder that enables the above-described binding. Examples of the binder include fluorine resin. Examples of the fluorine resin include polyvinylidene fluoride (PVDF), polytetrafluoroethylene (PTFE), tetrafluoroethylene-hexafluoropropylene copolymer (FEP), tetrafluoroethylene-perfluoroalkylvinylether copolymer (PFA), ethylene-tetrafluoroethylene copolymer (ETFE), polychlorotrifluoroethylene (PCTFE), ethylene-chlorotrifluoroethylene copolymer (ECTFE), and polyvinyl fluoride (PVF).

Another example of the binder is fluorine rubber including vinylidene fluoride. Examples of the fluorine rubber including vinylidene fluoride include vinylidene fluoride-hexafluoropropylene fluorine rubber (VDF-HFP fluorine rubber), vinylidene fluoride-hexafluoropropylene-tetrafluoroethylene fluorine rubber (VDF-HFPTFE fluorine rubber), vinylidene fluoride-pentafluoropropylene fluorine rubber (VDF-PFP fluorine rubber), vinylidene fluoride-pentafluoropropylene-tetrafluoroethylene fluorine rubber (VDF-PFP-TFE fluorine rubber), vinylidene fluoride-perfluoromethylvinylether-tetrafluoroethylene fluorine rubber (VDF-PFMVE-TFE fluorine rubber), and vinylidene fluoride-chlorotrifluoroethylene fluorine rubber (VDF-CTFE fluorine rubber).

The binder may be formed of conductive polymer with electronic conductivity and conductive polymer with ionic conductivity. An example of the conductive polymer with the electronic conductivity is polyacetylene. In this case, the binder exhibits the function of the conductive material; therefore, it is unnecessary to add the conductive material. An example of the conductive polymer with the ionic conductivity is obtained by combining alkali metal salt, which contains lithium salt or lithium mainly, with a polymer compound such as polyethylene oxide and polypropylene oxide.

The content of the positive electrode active material, the conductive material, and the binder in the positive electrode active material layer 24 is not limited in particular. The constituent ratio of the positive electrode active material in the positive electrode active material layer 24 is preferably 90.0% or more and 98.0% or less in mass ratio. In addition, the constituent ratio of the conductive material in the positive electrode active material layer 24 is preferably 1.0% or more and 3.0% or less in mass ratio. The constituent ratio of the binder in the positive electrode active material layer 24 is preferably 2.0% or more and 5.0% or less in mass ratio.

When the content of the positive electrode active material and the binder is in the above range, it is possible to suppress that the quantity of binder is too small to form the firm positive electrode active material layer. In addition, it is possible to suppress the tendency that the quantity of binder that does not contribute to the electric capacity increases so as to make it difficult to achieve enough volume energy density.

In addition, when the content of the positive electrode active material and the conductive material is in the above range, the sufficient electronic conductivity can be achieved in the positive electrode active material layer; thus, the high volume energy density and output characteristic can be achieved.

(Positive Electrode Current Collector)

The positive electrode current collector 22 may be any conductive plate material. Examples of the positive electrode current collector 22 include a metal thin plate of metal such as aluminum, copper, or nickel, and a thin plate of an alloy including any of these metals. Among these examples, the metal thin plate of aluminum, which is lightweight, is preferably used.

(Negative Electrode)

The negative electrode 30 includes the negative electrode current collector 32, and the negative electrode active material layer 34 that is provided on the negative electrode current collector 32.

In the negative electrode according to the present embodiment, a surface of the negative electrode active material layer has the reflectance Ra preferably in the range of $7.5 \leq Ra \leq 16.0\%$ at a wavelength of 550 nm.

By the use of the negative electrode according to the present embodiment, the high charging rate characteristic can be achieved. It is considered that the reflectance Ra of the surface of the negative electrode active material layer also reflects the flatness of the surface of the negative electrode active material layer and the surface compressed state of the negative electrode active material on the surface of the negative electrode active material layer. It is supposed that by using the positive electrode according to the present embodiment and the negative electrode in which the reflectance Ra of the surface of the negative electrode active material layer is in the range of 7.5 Ra 16.0% in combination, the charging rate characteristic of the lithium ion secondary battery can be improved.

(Negative Electrode Active Material)

As the material of the negative electrode active material, various known materials that have been used as the negative electrode active material for a lithium ion secondary battery can be used. Examples of the negative electrode active material include a carbon material such as graphite, hard carbon, soft carbon, or MCMB, silicon, a silicon-containing compound such as silicon oxide expressed by $SiO_x$ ($0<x<2$), and metal or semi-metal that forms alloy with metal lithium or lithium, and alloy thereof. As another material of the negative electrode active material, for example, an amorphous compound mainly containing oxide such as tin dioxide, and lithium titanate ($Li_4Ti_5O_{12}$) are given. Examples of the metal that forms the alloy with metal lithium include aluminum, silicon, tin, and germanium.

It is preferable to use the carbon material with the graphite structure as the negative electrode active material according to the present embodiment, and particularly preferable to use at least one of synthetic graphite and natural graphite.

The negative electrode active material layer according to the present embodiment may contain the carbon material with the graphite structure and may contain other negative electrode active materials with different compositions. Among these, metal or semi-metal that forms alloy with lithium, which is typified by silicon, and alloy thereof exhibit high charging-discharging capacity. Therefore, it is preferable to use these materials and the carbon material with the graphite structure in mixture.

In a case where the negative electrode active material according to the present embodiment contains the negative electrode active material with a composition different from that of the carbon material with the graphite structure, the content of the carbon material with the graphite structure in the total of the carbon material with the graphite structure and the negative electrode active materials with the different compositions is preferably 70.0 mass % or more, more preferably 90.0 mass % or more, and particularly preferably 95.0 mass % or more.

The negative electrode active material layer according to the present embodiment may include the members such as the conductive auxiliary agent and the binder, in addition to the negative electrode active material.

(Negative Electrode Conductive Auxiliary Agent)

Examples of the conductive auxiliary agent include carbon powder of carbon blacks and the like, carbon nanotube, carbon materials, micropowder of metal such as copper, nickel, stainless steel, and iron, a mixture of a carbon material and metal micropowder, and conductive oxide such as ITO. Among these examples, carbon powder of acetylene black, ethylene black, or the like is particularly preferable. In a case where the sufficient conductivity can be achieved merely by the negative electrode active material, the lithium ion secondary battery 100 may exclude the conductive auxiliary agent.

(Binder)

The binder may be similar to the binder that is used for the positive electrode. Other examples of the binder include cellulose, styrene butadiene rubber, ethylene propylene rubber, polyimide resin, polyamide imide resin, and acrylic resin.

The content of the negative electrode active material, the conductive material, and the binder in the negative electrode active material layer 34 is not limited in particular. The constituent ratio of the negative electrode active material in the negative electrode active material layer 34 is preferably 90.0% or more and 98.0% or less in mass ratio. In addition, the constituent ratio of the conductive material in the negative electrode active material layer 34 is preferably 0% or more and 3.0% or less in mass ratio. The constituent ratio of the binder in the negative electrode active material layer 34 is preferably 2.0% or more and 5.0% or less in mass ratio.

When the content of the negative electrode active material and the binder is in the above range, it is possible to suppress that the quantity of binder is too small to form the firm negative electrode active material layer. In addition, it is possible to suppress the tendency that the quantity of binder that does not contribute to the electric capacity increases so as to make it difficult to achieve enough volume energy density.

In addition, when the content of the negative electrode active material and the binder is in the above range, the sufficient electronic conductivity can be achieved in the negative electrode active material layer; thus, the high volume energy density and output characteristic can be achieved.

(Negative Electrode Current Collector)

The negative electrode current collector 32 may be any conductive plate material. Examples of the negative electrode current collector 32 include a metal thin plate of metal such as aluminum, copper, or nickel, and a thin plate of an alloy including any of these metals. Among these examples, the metal thin plate of copper is preferably used.

Note that the negative electrode 30 may exclude the negative electrode active material layer 34. In this case, in the charging, lithium ions are separated out as the metal lithium on the surface of the negative electrode current collector 32. On the other hand, in the discharging, the separated metal lithium is dissolved as lithium ions. In this case, the negative electrode active material layer 34 becomes unnecessary; therefore, the volume energy density of the lithium ion secondary battery can be improved. In that case, a copper foil can be used as the negative electrode current collector 32.

By using the positive electrode 20 and the negative electrode 30 as described above in the lithium ion secondary battery according to the present embodiment, the high charging rate characteristic can be achieved.

In particular, the ratio of the reflectance Rc1 of the surface of the positive electrode active material layer to the reflectance Ra of the surface of the negative electrode active material layer, Rc1/Ra, is preferably in the range of 1.00<Rc1/Ra≤1.53, more preferably 1.22<Rc1/Ra≤1.38.

In addition, the ratio of the reflectance Rc2 of the surface of the positive electrode active material layer to the reflectance Ra of the surface of the negative electrode active material layer, Rc2/Ra, is preferably in the range of 0.29≤Rc2/Ra<1.00, more preferably 0.44 Rc2/Ra≤0.63.

Furthermore, the ratio of the reflectance Rc3 of the surface of the positive electrode active material layer to the reflectance Ra of the surface of the negative electrode active material layer, Rc3/Ra, is preferably in the range of 0.13≤Rc3/Ra≤0.75, more preferably 0.39≤Rc3/Ra≤0.60.

It is estimated that when the ratios Rc1/Ra, Rc2/Ra, and Rc3/Ra satisfy the above range, the impregnation with the electrolyte solution and the suppression of the side reaction on the surface of the positive electrode active material layer and the surface of the negative electrode active material layer are both achieved and lithium ions are exchanged suitably.

(Separator)

The separator 18 may be formed of a porous structure with an electrically insulating property. Examples of the separator 18 include a single-layer body and a multilayer stacked body of films made of polyethylene, polypropylene, and polyolefin, an extension film of a mixture of the above resins, and a fiber nonwoven fabric made of at least one kind of constituent material selected from the group consisting of cellulose, polyester, and polypropylene.

(Nonaqueous Electrolyte Solution)

The nonaqueous electrolyte solution includes a nonaqueous solvent and an electrolyte dissolved in this nonaqueous solvent. The nonaqueous electrolyte solution may contain cyclic carbonate and chain carbonate as the nonaqueous solvent.

The cyclic carbonate may be any cyclic carbonate that can solvate the electrolyte and may be a known cyclic carbonate without particular limitation. Examples of the cyclic carbonate include ethylene carbonate (EC), propylene carbonate (PC), butylene carbonate (BC), and fluoroethylene carbonate (FEC).

The chain carbonate may be any chain carbonate that can decrease the viscosity of the cyclic carbonate, and may be a known chain carbonate without particular limitation. Examples of the chain carbonate include diethyl carbonate (DEC), dimethyl carbonate (DMC), and ethyl methyl carbonate (EMC). Moreover, methyl acetate, ethyl acetate, methyl propionate, ethyl propionate, γ-butyrolactone, 1,2-dimethoxy ethane, 1,2-diethoxy ethane, or the like may be mixed to be used as the chain carbonate.

It is preferable that the nonaqueous solvent according to the present embodiment contains ethylene carbonate and the ethylene carbonate is contained in the range of 10 to 30 vol. % in the entire nonaqueous solvent.

It is estimated that this is because ethylene carbonate, which is partially decomposed on the surface of the electrode to become a film component, is not decomposed excessively and the excellent film can be formed.

The nonaqueous electrolyte solution according to the present embodiment may be used in combination with a gel electrolyte and/or a solid electrolyte.

Examples of the electrolyte include lithium salt such as $LiPF_6$, $LiClO_4$, $LiBF_4$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. Any of these lithium salts may be used alone or two or more kinds thereof may be used in combination. In particular, the electrolyte preferably includes $LiPF_6$ from the viewpoint of the conductivity.

When $LiPF_6$ is dissolved in the nonaqueous solvent, it is preferable to control the concentration of the electrolyte in the nonaqueous electrolyte solution to be in the range of 0.5 to 2.0 mol/L. When the concentration of the electrolyte is 0.5 mol/L or more, the conductivity of the nonaqueous electrolyte solution can be sufficiently secured. Thus, sufficient capacity can be achieved easily in the charging and discharging. In addition, when the concentration of the electrolyte is 2.0 mol/L or less, the increase in viscosity of the nonaqueous electrolyte solution can be suppressed; therefore, the mobility of lithium ions can be secured sufficiently. As a result, sufficient capacity can be achieved easily in the charging and discharging.

In the case of mixing $LiPF_6$ with another electrolyte, it is preferable that the lithium ion concentration in the nonaqueous electrolyte solution is 0.5 to 2.0 mol/L, and more preferable that the lithium ion concentration based on $LiPF_6$ is 50 mol % or more.

(Measurement of Reflectance)

The reflectance Rc and Ra in the present embodiment can be measured using a commercial spectrophotometer or the like.

The reflectance Rc of the surface of the positive electrode active material layer and the reflectance Ra of the surface of the negative electrode active material layer according to the present embodiment can be controlled by a condition in molding the positive electrode active material layer and the negative electrode active material layer, and a post process after the molding.

Various methods are given as methods of controlling the reflectance. In one example, the reflectance can be varied by changing the pressure and the number of times of pressing the electrode, and the heating condition in the pressing, for example. In another example, the reflectance can be controlled by changing the material and the surface shape of a roll plate and a roller that are used in the pressing.

In still another example, the reflectance can be controlled by polishing the surface of the rolled electrode, or applying top coating on the surface of the rolled electrode. In the case of applying the top coating, it is preferable to use a top coating solution with conductivity in order to suppress the decrease in battery characteristic.

(Manufacturing Method for Positive Electrode 20 and Negative Electrode 30)

Next, description is made of a manufacturing method for the positive electrode 20 and the negative electrode 30 according to the present embodiment.

The binder and the solvent are mixed in the positive electrode active material or the negative electrode active material described above. If necessary, the conductive auxiliary agent may be added. The solvent may be, for example, water and N-methyl-2-pyrrolidone. A method of mixing the component of the coating is not limited to a particular method, and a mixing order is not limited either to a particular order. The coating is applied to the current collectors 22 and 32. The coating method is not limited to a particular method and may be a method that is usually employed to manufacture the electrode. Examples of the coating method include a slit die coating method and a doctor blade method.

Subsequently, the solvent is removed from the coating applied on the current collectors 22 and 32. The removing method is not limited to a particular method. For example, the current collectors 22 and 32 where the coating is applied may be dried in an atmosphere of 80 to 150° C.

The electrode where the positive electrode active material layer 24 is formed and the electrode where the negative electrode active material layer 34 is formed are subjected to a pressing process by a roll pressing device as necessary. By adjusting the pressure, the number of times of pressing, and the shape of the press material of the pressing device in this process, the reflectance of the surface of each of the positive electrode active material layer 24 and the negative electrode active material layer 34 can be controlled.

Through this process, the positive electrode 20 where the positive electrode active material layer 24 is formed on the positive electrode current collector 22 and the negative electrode 30 where the negative electrode active material layer 34 is formed on the negative electrode current collector 32 are obtained.

(Manufacturing Method for Lithium Ion Secondary Battery)

Subsequently, description is made of a manufacturing method for a lithium ion secondary battery according to the present embodiment. The manufacturing method for a lithium ion secondary battery according to the present embodiment includes a step of sealing in the package 50, the positive electrode 20 including the positive electrode active material, the negative electrode 30 including the negative electrode active material, the separator 10 interposed between the positive electrode and the negative electrode, and the nonaqueous electrolyte solution containing lithium salt.

For example, the positive electrode 20 including the positive electrode active material described above, the negative electrode 30, and the separator 10 are stacked. By heating and pressurizing the positive electrode 20 and the negative electrode 30 from a direction perpendicular to the stacking direction with the use of a pressing machine, the positive electrode 20, the separator 10, and the negative electrode 30 are disposed in close contact. Into the package 50 with a bag shape, which is manufactured in advance, for example, the stacked body 40 is put and the nonaqueous electrolyte solution containing the lithium salt is poured.

Thus, the lithium ion secondary battery can be manufactured. Instead of pouring the nonaqueous electrolyte solution containing the lithium salt into the package, the stacked body 40 may be impregnated with the nonaqueous electrolyte solution containing the lithium salt.

The present disclosure is not limited to the embodiment described above. The embodiment described above is the mere example and any subject that has the structure substantially the same as the technical concept described in the scope of claims and exerts the similar operation effect is incorporated in the technical range of the present disclosure.

The embodiment according to the present disclosure has been described in detail. However, the technique according to the present disclosure is not limited to the embodiment described above, and various modifications are possible. For example, the above embodiment has described the laminate film type lithium ion secondary battery; however, the present disclosure is not limited to this example and the technique according to the present disclosure is similarly applicable to a lithium ion secondary battery in which the positive electrode, the negative electrode, and the separator is wound or folded. In addition, the technique according to the present disclosure is suitably applicable to a lithium ion secondary battery with a cylindrical, rectangular, or coin shape.

EXAMPLES

The technique according to the present disclosure will hereinafter be described in more detail with reference to Examples and Comparative examples.

Example 1

(Manufacture of Positive Electrode)

The following components were weighed: 97 parts by weight of $LiCoO_2$ as the positive electrode active material, 1.5 parts by weight of PVDF (HSV-800) as the binder, and 1.5 parts by weight of carbon black (Super-P) as the conductive auxiliary agent. These components were diffused in N-methyl-2-pyrrolidone (NMP) as the solvent, thereby preparing slurry. The prepared slurry was applied on a 15-μm-thick aluminum foil and dried at 120° C. for 30 minutes, so that the solvent was removed. After that, the aluminum foil was pressed with a linear pressure of 2000 kgf/cm using a roll pressing device in which the roller for pressing was heated at 81° C. The pressing process was followed by air-cooling, and this process is regarded as one cycle of pressing process; here, three cycles of the pressing process were performed. After that, the pressed aluminum foil was punched into an electrode size of 18×22 mm using a die; thus, the positive electrode for a lithium ion secondary battery was manufactured.

The reflectance Rc1, at a reflectance of 550 nm, of the surface of the positive electrode active material layer of the positive electrode obtained in this manner was measured using the spectrophotometer (made by Konica Minolta, Inc., SPECTRO PHOTOMETER CM-5). The measurement was performed three times and an average value of the measurement values was calculated as a measurement value. The reflectance Rc1 of the positive electrode active material layer obtained in this manner was 8.0%.

The obtained positive electrode was punched into a square of 10 $cm^2$, and the density dc1, the supporting quantity Lc1 per unit area, and the porosity Pc1 of the positive electrode active material layer were calculated. The results indicate that dc1=3.80 $g/cm^3$, Lc1=14.1 $mg/cm^2$, and Pc1=23.0%.

(Manufacture of Negative Electrode)

The following components were weighed: 96 parts by mass of graphite powder as the negative electrode active material, 2.5 parts by weight of styrene butadiene rubber as the binder, and 1.5 parts by weight of carboxymethyl cellulose as a thickener. These components were diffused in water; thus, slurry was prepared. The prepared slurry was applied on a 15-μm-thick copper foil and dried at 120° C. for 30 minutes, so that the solvent was removed. After that, the copper foil was pressed with a linear pressure of 500 kgf/cm using a roll pressing machine in which the roller for pressing was heated at 82° C. The pressing process was followed by air-cooling, and this process is regarded as one cycle of pressing process; here, three cycles of the pressing process were performed.

The pressed copper foil was punched into an electrode size of 19×23 mm using a die; thus, the negative electrode for a lithium ion secondary battery was manufactured.

The reflectance Ra, at a wavelength of 550 nm, of the surface of the negative electrode active material layer in the negative electrode obtained in this manner was measured using the spectrophotometer (made by Konica Minolta, Inc., SPECTRO PHOTOMETER CM-5). The measurement was performed three times and the average value thereof was used as the measurement value. The reflectance Ra of the negative electrode active material layer obtained in this manner was 7.8%. Therefore, the ratio of Rc1 to Ra, Rc1/Ra, was 1.03.

(Nonaqueous Electrolyte Solution)

The nonaqueous electrolyte solution was prepared by dissolving $LiPF_6$ as the electrolyte at 1.3 mol/L in the nonaqueous solvent in which ethylene carbonate (EC), propylene carbonate (PC), and ethyl methyl carbonate (EMC) were mixed. The volume ratio among EC, PC, and EMC in the nonaqueous solvent was EC:PC:EMC=10:10:80.

(Separator)

As the separator, a polyethylene microporous film with a thickness of 20 (porosity: 40%, shutdown temperature: 134° C.) was prepared.

(Manufacture of Battery Cell)

The positive electrode for a lithium ion secondary battery and the negative electrode for a lithium ion secondary battery described above were stacked with the separator made of polyethylene interposed therebetween; thus, an electrode stacked body was manufactured. This is treated as "one layer of electrode body", and through the similar manufacturing method, an electrode stacked body including four layers of electrode bodies was manufactured. Note that the positive electrode and the negative electrode include a mixed layer on each surface. Therefore, the electrode stacked body includes three negative electrodes, two positive electrodes, and four separators. In the negative electrode of the electrode stacked body, a negative electrode lead made of nickel was attached to a projecting end part of the copper foil where the negative electrode mixed layer was not provided. On the other hand, in the positive electrode of the electrode stacked body, a positive electrode lead made of aluminum was attached using an ultrasonic welding machine to a projecting end part of an aluminum foil where the positive electrode mixed layer was not provided. This electrode stacked body was welded to an aluminum laminate film for a package, and by folding the laminate film, the electrode stacked body was inserted into the package. The periphery of the package was heat sealed except one side, so that an opening was provided to the package. Through this opening, the nonaqueous electrolyte solution was poured into the package. After that, the opening of the package was heat sealed while the pressure was reduced by a vacuum sealing machine. Thus, a battery cell of a laminate type according to Example 1 was manufactured. Note that the battery cell was manufactured in a dry room.

Example 2

A battery cell according to Example 2 was manufactured by the same method as that of Example 1 except that the roller for pressing in the pressing process was heated at 88° C. in the manufacture of the positive electrode.

Example 3

A battery cell according to Example 3 was manufactured by the same method as that of Example 1 except that the roller for pressing in the pressing process was heated at 91° C. in the manufacture of the positive electrode.

Example 4

A battery cell according to Example 4 was manufactured by the same method as that of Example 1 except that the roller for pressing in the pressing process was heated at 97° C. in the manufacture of the positive electrode.

Example 5

A battery cell according to Example 5 was manufactured by the same method as that of Example 1 except that the roller for pressing in the pressing process was set to 105° C. in the manufacture of the positive electrode.

Example 6

A battery cell according to Example 6 was manufactured by the same method as that of Example 1 except that the roller for pressing in the pressing process was set to 70° C. in the manufacture of the positive electrode.

Example 7

A battery cell according to Example 7 was manufactured by the same method as that of Example 1 except that the roller for pressing in the pressing process was set to 54° C. in the manufacture of the positive electrode.

Example 8

A battery cell according to Example 8 was manufactured by the same method as that of Example 3 except that the linear pressure in the pressing process was set to 1050 kgf/cm in the manufacture of the positive electrode.

Example 9

A battery cell according to Example 9 was manufactured by the same method as that of Example 3 except that the linear pressure in the pressing process was set to 1120 kgf/cm in the manufacture of the positive electrode.

Example 10

A battery cell according to Example 10 was manufactured by the same method as that of Example 3 except that the linear pressure in the pressing process was set to 1500 kgf/cm in the manufacture of the positive electrode.

Example 11

A battery cell according to Example 11 was manufactured by the same method as that of Example 3 except that the linear pressure in the pressing process was set to 1850 kgf/cm in the manufacture of the positive electrode.

Example 12

A battery cell according to Example 12 was manufactured by the same method as that of Example 3 except that the linear pressure in the pressing process was set to 2600 kgf/cm in the manufacture of the positive electrode.

Example 13

A battery cell according to Example 13 was manufactured by the same method as that of Example 3 except that the linear pressure in the pressing process was set to 3000 kgf/cm in the manufacture of the positive electrode.

Example 14

A battery cell according to Example 14 was manufactured by the same method as that of Example 3 except that the quantity of slurry that was applied was adjusted so that the supporting quantity Lc1 per unit area became 12.0 mg/cm$^2$ in the manufacture of the positive electrode. The result of measuring the supporting quantity of Lc1 of the manufactured positive electrode per unit area was 12.1 mg/cm$^2$.

Example 15

A battery cell according to Example 15 was manufactured by the same method as that of Example 3 except that the quantity of slurry that was applied was adjusted so that the supporting quantity Lc1 per unit area became 13.0 mg/cm$^2$ in the manufacture of the positive electrode. The result of measuring the supporting quantity Lc1 of the manufactured positive electrode per unit area was 12.8 mg/cm$^2$.

Example 16

A battery cell according to Example 16 was manufactured by the same method as that of Example 3 except that the quantity of slurry that was applied was adjusted so that the supporting quantity Lc1 per unit area became 15.5 mg/cm$^2$ in the manufacture of the positive electrode. The result of measuring the supporting quantity Lc1 of the manufactured positive electrode per unit area was 15.4 mg/cm$^2$.

Example 17

A battery cell according to Example 17 was manufactured by the same method as that of Example 3 except that the quantity of slurry that was applied was adjusted so that the supporting quantity Lc1 per unit area became 16.0 mg/cm$^2$ in the manufacture of the positive electrode. The result of measuring the supporting quantity of Lc1 of the manufactured positive electrode per unit area was 16.1 mg/cm$^2$.

Example 18

A battery cell according to Example 18 was manufactured by the same method as that of Example 3 except that the quantity of slurry that was applied was adjusted so that the supporting quantity Lc1 per unit area became 20.0 mg/cm$^2$ in the manufacture of the positive electrode. The result of measuring the supporting quantity of Lc1 of the manufactured positive electrode per unit area was 20.1 mg/cm$^2$.

Example 19

A battery cell according to Example 19 was manufactured by the same method as that of Example 3 except that the quantity of slurry that was applied was adjusted so that the supporting quantity Lc1 per unit area became 25.0 mg/cm$^2$ in the manufacture of the positive electrode. The result of measuring the supporting quantity of Lc1 of the manufactured positive electrode per unit area was 25.0 mg/cm$^2$.

Example 20

A battery cell according to Example 20 was manufactured by the same method as that of Example 3 except that the quantity of slurry that was applied was adjusted so that the supporting quantity Lc1 per unit area became 25.5 mg/cm$^2$ in the manufacture of the positive electrode. The result of measuring the supporting quantity Lc1 of the manufactured positive electrode per unit area was 25.5 mg/cm$^2$.

Example 21

A battery cell according to Example 21 was manufactured by the same method as that of Example 3 except that the roller for pressing in the pressing process was heated at 75° C. in the manufacture of the negative electrode.

Example 22

A battery cell according to Example 22 was manufactured by the same method as that of Example 3 except that the roller for pressing in the pressing process was heated at 79° C. in the manufacture of the negative electrode.

Example 23

A battery cell according to Example 23 was manufactured by the same method as that of Example 3 except that the roller for pressing in the pressing process was heated at 89° C. in the manufacture of the negative electrode.

Example 24

A battery cell according to Example 24 was manufactured by the same method as that of Example 3 except that the roller for pressing in the pressing process was heated at 96° C. in the manufacture of the negative electrode.

Example 25

A battery cell according to Example 25 was manufactured by the same method as that of Example 3 except that the roller for pressing in the pressing process was heated at 98° C. in the manufacture of the negative electrode.

Example 26

A battery cell according to Example 26 was manufactured by the same method as that of Example 3 except that the roller for pressing in the pressing process was heated at 108° C. and the number of times of pressing was set to five cycles in the manufacture of the negative electrode.

Example 27

A battery cell according to Example 27 was manufactured by the same method as that of Example 3 except that the roller for pressing in the pressing process was heated at 115° C. and the number of times of pressing was set to five cycles in the manufacture of the negative electrode.

Example 28

A battery cell according to Example 28 was manufactured by the same method as that of Example 1 except that the roller for pressing in the pressing process was heated at 89° C. in the manufacture of the negative electrode.

Example 29

A battery cell according to Example 29 was manufactured by the same method as that of Example 1 except that $LiNi_{1/3}Mn_{1/3}CO_{1/3}O_2$ was used as the positive electrode active material.

Example 30

A battery cell according to Example 30 was manufactured by the same method as that of Example 2 except that $LiNi_{1/3}Mn_{1/3}CO_{1/3}O_2$ was used as the positive electrode active material.

Example 31

A battery cell according to Example 31 was manufactured by the same method as that of Example 3 except that $LiNi_{1/3}Mn_{1/3}CO_{1/3}O_2$ was used as the positive electrode active material.

Example 32

A battery cell according to Example 32 was manufactured by the same method as that of Example 4 except that $LiNi_{1/3}Mn_{1/3}CO_{1/3}O_2$ was used as the positive electrode active material.

Example 33

A battery cell according to Example 33 was manufactured by the same method as that of Example 5 except that $LiNi_{1/3}Mn_{1/3}CO_{1/3}O_2$ was used as the positive electrode active material.

Example 34

A battery cell according to Example 34 was manufactured by the same method as that of Example 3 except that silicon oxide was used as the negative electrode active material.

Example 35

A battery cell according to Example 35 was manufactured by the same method as that of Example 3 except that lithium titanate ($Li_4Ti_5O_{12}$) was used as the negative electrode active material.

Example 36

A battery cell according to Example 36 was manufactured by the same method as that of Example 3 except that a mixture of 48 parts by mass of the graphite powder and 48 parts by mass of silicon oxide was used as the negative electrode active material.

Example 37

A battery cell according to Example 37 was manufactured by the same method as that of Example 3 except that a mixture of EC, PC, and EMC at a volume ratio of EC:PC:EMC=20:10:70 was used as the nonaqueous solvent of the nonaqueous electrolyte solution.

Example 38

A battery cell according to Example 38 was manufactured by the same method as that of Example 3 except that a mixture of EC, PC, and EMC at a volume ratio of EC:PC:EMC=30:10:60 was used as the nonaqueous solvent of the nonaqueous electrolyte solution.

Example 39

A battery cell according to Example 39 was manufactured by the same method as that of Example 3 except that a mixture of EC, PC, and EMC at a volume ratio of EC:PC:EMC=20:20:60 was used as the nonaqueous solvent of the nonaqueous electrolyte solution.

Example 40

A battery cell according to Example 40 was manufactured by the same method as that of Example 3 except that a mixture of EC and EMC at a volume ratio of EC:EMC=30:70 was used as the nonaqueous solvent of the nonaqueous electrolyte solution.

Example 41

A battery cell according to Example 41 was manufactured by the same method as that of Example 3 except that a mixture of EC and EMC at a volume ratio of EC:EMC=20:80 was used as the nonaqueous solvent of the nonaqueous electrolyte solution.

Example 42

A battery cell according to Example 42 was manufactured by the same method as that of Example 3 except that a mixture of EC and EMC at a volume ratio of EC:EMC=10:90 was used as the nonaqueous solvent of the nonaqueous electrolyte solution.

Example 43

A battery cell according to Example 43 was manufactured by the same method as that of Example 3 except that a mixture of EC, PC, and EMC at a volume ratio of EC:PC:EMC=40:10:50 was used as the nonaqueous solvent of the nonaqueous electrolyte solution.

Example 44

A battery cell according to Example 44 was manufactured by the same method as that of Example 3 except that a mixture of FEC, PC, and EMC at a volume ratio of FEC:PC:EMC=10:10:80 was used as the nonaqueous solvent of the nonaqueous electrolyte solution.

Comparative Example 1

A battery cell according to Comparative example 1 was manufactured by the same method as that of Example 1 except that the roller for pressing in the pressing process was heated at 43° C. in the manufacture of the positive electrode.

Comparative Example 2

A battery cell according to Comparative example 2 was manufactured by the same method as that of Example 1 except that the roller for pressing in the pressing process was heated at 110° C. and the number of times of pressing was set to three cycles in the manufacture of the positive electrode.

Comparative Example 3

A battery cell according to Comparative example 3 was manufactured by the same method as that of Comparative example 1 except that $LiNi_{1/3}Mn_{1/3}Co_{1/3}O_2$ was used as the positive electrode active material.

Comparative Example 4

A battery cell according to Comparative example 4 was manufactured by the same method as that of Comparative example 2 except that $LiNi_{1/3}Mn_{1/3}Co_{1/3}O_2$ was used as the positive electrode active material.

In regard to the positive electrodes and negative electrodes used in Examples 2 to 36 and Comparative examples 1 to 4, the reflectance Rc1 of the surface of the positive electrode active material layer at a wavelength of 550 nm and the reflectance Ra of the surface of the negative electrode active material layer at a wavelength of 550 nm were measured using the same method as that of Example 1, and the ratio Rc1/Ra was calculated. In addition, the density dc1, the supporting quantity Lc1 per unit area, and the porosity Pc1 of the positive electrode active material layer were measured by the same method as that of Example 1. The results are shown in Table 1 in addition to the results in Example 1.

Example 45

(Manufacture of Positive Electrode)

The following components were weighed: 95 parts by weight of $LiNi_{0.85}Co_{0.10}Al_{0.05}O_2$ as the positive electrode active material, 3.0 parts by weight of PVDF (HSV-800) as the binder, and 2.0 parts by weight of carbon black (Super-P) as the conductive auxiliary agent. These components were diffused in N-methyl-2-pyrrolidone (NMP) as the solvent; thus, slurry was prepared. The obtained slurry was applied on a 15-μm-thick aluminum foil and dried at 120° C. for 30 minutes, so that the solvent was removed. After that, the aluminum foil was pressed with a linear pressure of 1500 kgf/cm using a roll pressing machine in which a roller for pressing was heated at 81° C. The pressing was followed by air-cooling, and this process is regarded as one cycle of pressing process; here, three cycles of the pressing process were performed. After that, the pressed aluminum foil was punched into an electrode size of 18 mm×22 mm using a die, and thus, the positive electrode for a lithium ion secondary battery was manufactured.

The reflectance Rc2, at a wavelength of 550 nm, of the surface of the positive electrode active material layer in the positive electrode obtained in this manner was measured using the spectrophotometer (made by Konica Minolta, Inc., SPECTRO PHOTOMETER CM-5). The measurement was performed three times and the average value thereof was used as the measurement value. The reflectance Rc2 of the positive electrode active material layer obtained in this manner was 3.5%.

The obtained positive electrode was cut into a square of 10 cm², and the density dc2, the supporting quantity Lc2 per unit area, and the porosity Pc2 of the positive electrode active material layer were calculated. The results indicate that dc2=3.30 g/cm³, Lc2=13.0 mg/cm², and Pc2=23.0%.

A battery cell according to Example 45 was manufactured by the same method as that of Example 1 except that the aforementioned positive electrode was used. The ratio of Rc2 to the reflectance Ra of the surface of the negative electrode active material layer at a wavelength of 550 nm, Rc2/Ra, was 0.44.

Example 46

A battery cell according to Example 46 was manufactured by the same method as that of Example 45 except that the roller for pressing in the pressing process was heated at 88° C. in the manufacture of the positive electrode.

Example 47

A battery cell according to Example 47 was manufactured by the same method as that of Example 45 except that the roller for pressing in the pressing process was heated at 91° C. in the manufacture of the positive electrode.

Example 48

A battery cell according to Example 48 was manufactured by the same method as that of Example 45 except that the roller for pressing in the pressing process was heated at 97° C. in the manufacture of the positive electrode.

Example 49

A battery cell according to Example 49 was manufactured by the same method as that of Example 45 except that the roller for pressing in the pressing process was set to 105° C. in the manufacture of the positive electrode.

Example 50

A battery cell according to Example 50 was manufactured by the same method as that of Example 45 except that the roller for pressing in the pressing process was set to 105° C. and the number of times of pressing was set to three cycles in the manufacture of the positive electrode.

Example 51

A battery cell according to Example 51 was manufactured by the same method as that of Example 45 except that the roller for pressing in the pressing process was set to 72° C. in the manufacture of the positive electrode.

Example 52

A battery cell according to Example 52 was manufactured by the same method as that of Example 45 except that the roller for pressing in the pressing process was set to 118° C. and the number of times of pressing was set to five cycles in the manufacture of the positive electrode.

Example 53

A battery cell according to Example 53 was manufactured by the same method as that of Example 47 except that the linear pressure in the pressing process was set to 1000 kgf/cm in the manufacture of the positive electrode.

Example 54

A battery cell according to Example 54 was manufactured by the same method as that of Example 47 except that the linear pressure in the pressing process was set to 1200 kgf/cm in the manufacture of the positive electrode.

Example 55

A battery cell according to Example 55 was manufactured by the same method as that of Example 47 except that the linear pressure in the pressing process was set to 1400 kgf/cm in the manufacture of the positive electrode.

Example 56

A battery cell according to Example 56 was manufactured by the same method as that of Example 47 except that the linear pressure in the pressing process was set to 1800 kgf/cm in the manufacture of the positive electrode.

Example 57

A battery cell according to Example 57 was manufactured by the same method as that of Example 47 except that the linear pressure in the pressing process was set to 2000 kgf/cm in the manufacture of the positive electrode.

Example 58

A battery cell according to Example 58 was manufactured by the same method as that of Example 47 except that the linear pressure in the pressing process was set to 2500 kgf/cm in the manufacture of the positive electrode.

Example 59

A battery cell according to Example 59 was manufactured by the same method as that of Example 47 except that the quantity of slurry that was applied was adjusted so that the supporting quantity Lc2 per unit area became 11.0 mg/cm² in the manufacture of the positive electrode. The result of measuring the supporting quantity Lc2 of the manufactured positive electrode per unit area was 11.0 mg/cm².

Example 60

A battery cell according to Example 60 was manufactured by the same method as that of Example 47 except that the quantity of slurry that was applied was adjusted so that the supporting quantity Lc2 per unit area became 12.0 mg/cm² in the manufacture of the positive electrode. The result of measuring the supporting quantity Lc2 of the manufactured positive electrode per unit area was 12.2 mg/cm².

Example 61

A battery cell according to Example 61 was manufactured by the same method as that of Example 47 except that the quantity of slurry that was applied was adjusted so that the supporting quantity Lc2 per unit area became 15.0 mg/cm² in the manufacture of the positive electrode. The result of measuring the supporting quantity Lc2 of the manufactured positive electrode per unit area was 14.9 mg/cm².

Example 62

A battery cell according to Example 62 was manufactured by the same method as that of Example 47 except that the quantity of slurry that was applied was adjusted so that the supporting quantity Lc2 per unit area became 16.0 mg/cm² in the manufacture of the positive electrode. The result of measuring the supporting quantity Lc2 of the manufactured positive electrode per unit area was 16.0 mg/cm².

Example 63

A battery cell according to Example 63 was manufactured by the same method as that of Example 47 except that the quantity of slurry that was applied was adjusted so that the supporting quantity Lc2 per unit area became 20.0 mg/cm² in the manufacture of the positive electrode. The result of measuring the supporting quantity Lc2 of the manufactured positive electrode per unit area was 19.8 mg/cm².

Example 64

A battery cell according to Example 64 was manufactured by the same method as that of Example 47 except that the quantity of slurry that was applied was adjusted so that the supporting quantity Lc2 per unit area became 24.0 mg/cm² in the manufacture of the positive electrode. The result of measuring the supporting quantity Lc2 of the manufactured positive electrode per unit area was 24.0 mg/cm².

Example 65

A battery cell according to Example 65 was manufactured by the same method as that of Example 47 except that the quantity of slurry that was applied was adjusted so that the supporting quantity Lc2 per unit area became 24.5 mg/cm² in the manufacture of the positive electrode. The result of measuring the supporting quantity Lc2 of the manufactured positive electrode per unit area was 24.4 mg/cm².

Example 66

A battery cell according to Example 66 was manufactured by the same method as that of Example 47 except that the negative electrode manufactured in Example 21 was used.

Example 67

A battery cell according to Example 67 was manufactured by the same method as that of Example 47 except that the negative electrode manufactured in Example 22 was used.

Example 68

A battery cell according to Example 68 was manufactured by the same method as that of Example 47 except that the negative electrode manufactured in Example 23 was used.

Example 69

A battery cell according to Example 69 was manufactured by the same method as that of Example 47 except that the negative electrode manufactured in Example 24 was used.

Example 70

A battery cell according to Example 70 was manufactured by the same method as that of Example 47 except that the negative electrode manufactured in Example 25 was used.

Example 71

A battery cell according to Example 71 was manufactured by the same method as that of Example 47 except that the negative electrode manufactured in Example 26 was used.

Example 72

A battery cell according to Example 72 was manufactured by the same method as that of Example 47 except that the negative electrode manufactured in Example 27 was used.

Example 73

A battery cell according to Example 73 was manufactured by the same method as that of Example 45 except that the negative electrode manufactured in Example 28 was used.

Example 74

A battery cell according to Example 74 was manufactured by the same method as that of Example 45 except that $LiNi_{0.6}Mn_{0.2}Co_{0.2}O_2$ was used as the positive electrode active material.

Example 75

A battery cell according to Example 75 was manufactured by the same method as that of Example 46 except that $LiNi_{0.6}Mn_{0.2}Co_{0.2}O_2$ was used as the positive electrode active material.

Example 76

A battery cell according to Example 76 was manufactured by the same method as that of Example 47 except that $LiNi_{0.6}Mn_{0.2}Co_{0.2}O_2$ was used as the positive electrode active material.

Example 77

A battery cell according to Example 77 was manufactured by the same method as that of Example 48 except that $LiNi_{0.6}Mn_{0.2}Co_{0.2}O_2$ was used as the positive electrode active material.

Example 78

A battery cell according to Example 78 was manufactured by the same method as that of Example 49 except that $LiNi_{0.6}Mn_{0.2}Co_{0.2}O_2$ was used as the positive electrode active material.

Example 79

A battery cell according to Example 79 was manufactured by the same method as that of Example 45 except that $LiNi_{0.8}Mn_{0.1}Co_{0.1}O_2$ was used as the positive electrode active material.

Example 80

A battery cell according to Example 80 was manufactured by the same method as that of Example 46 except that $LiNi_{0.8}Mn_{0.1}Co_{0.1}O_2$ was used as the positive electrode active material.

Example 81

A battery cell according to Example 81 was manufactured by the same method as that of Example 47 except that $LiNi_{0.8}Mn_{0.1}Co_{0.1}O_2$ was used as the positive electrode active material.

Example 82

A battery cell according to Example 82 was manufactured by the same method as that of Example 48 except that $LiNi_{0.8}Mn_{0.1}Co_{0.1}O_2$ was used as the positive electrode active material.

Example 83

A battery cell according to Example 83 was manufactured by the same method as that of Example 49 except that $LiNi_{0.8}Mn_{0.1}Co_{0.1}O_2$ was used as the positive electrode active material.

Example 84

A battery cell according to Example 84 was manufactured by the same method as that of Example 47 except that silicon oxide was used as the negative electrode active material.

Example 85

A battery cell according to Example 85 was manufactured by the same method as that of Example 47 except that lithium titanate ($Li_4Ti_5O_{12}$) was used as the negative electrode active material.

Example 86

A battery cell according to Example 86 was manufactured by the same method as that of Example 47 except that a mixture of 48 parts by mass of graphite powder and 48 parts by mass of silicon oxide was used as the negative electrode active material.

Example 87

A battery cell according to Example 87 was manufactured by the same method as that of Example 47 except that a mixture containing EC, PC, and EMC at a volume ratio of EC:PC:EMC=20:10:70 was used as the nonaqueous solvent of the nonaqueous electrolyte solution.

Example 88

A battery cell according to Example 88 was manufactured by the same method as that of Example 47 except that a mixture containing EC, PC, and EMC at a volume ratio of EC:PC:EMC=30:10:60 was used as the nonaqueous solvent of the nonaqueous electrolyte solution.

Example 89

A battery cell according to Example 89 was manufactured by the same method as that of Example 47 except that a mixture containing EC, PC, and EMC at a volume ratio of EC:PC:EMC=20:20:60 was used as the nonaqueous solvent of the nonaqueous electrolyte solution.

Example 90

A battery cell according to Example 90 was manufactured by the same method as that of Example 47 except that a mixture containing EC and EMC at a volume ratio of EC:EMC=30:70 was used as the nonaqueous solvent of the nonaqueous electrolyte solution.

Example 91

A battery cell according to Example 91 was manufactured by the same method as that of Example 47 except that a mixture containing EC and EMC at a volume ratio of EC:EMC=20:80 was used as the nonaqueous solvent of the nonaqueous electrolyte solution.

Example 92

A battery cell according to Example 92 was manufactured by the same method as that of Example 47 except that a mixture containing EC and EMC at a volume ratio of EC:EMC=10:90 was used as the nonaqueous solvent of the nonaqueous electrolyte solution.

Example 93

A battery cell according to Example 93 was manufactured by the same method as that of Example 47 except that a mixture containing EC, PC, and EMC at a volume ratio of EC:PC:EMC=40:10:50 was used as the nonaqueous solvent of the nonaqueous electrolyte solution.

Example 94

A battery cell according to Example 94 was manufactured by the same method as that of Example 47 except that a mixture containing FEC, PC, and EMC at a volume ratio of FEC:PC:EMC=10:10:80 was used as the nonaqueous solvent of the nonaqueous electrolyte solution.

Comparative Example 5

A battery cell according to Comparative example 5 was manufactured by the same method as that of Example 41 except that the roller for pressing in the pressing process was heated at 45° C. in the manufacture of the positive electrode.

Comparative Example 6

A battery cell according to Comparative example 6 was manufactured by the same method as that of Example 41 except that the roller for pressing in the pressing process was set to 110° C. and the number of times of pressing was set to five cycles in the manufacture of the positive electrode.

Comparative Example 7

A battery cell according to Comparative example 7 was manufactured by the same method as that of Comparative example 5 except that $LiNi_{0.6}Mn_{0.2}Co_{0.2}O_2$ was used as the positive electrode active material.

Comparative Example 8

A battery cell according to Comparative example 8 was manufactured by the same method as that of Comparative example 6 except that $LiNi_{0.6}Mn_{0.2}Co_{0.2}O_2$ was used as the positive electrode active material.

Comparative Example 9

A battery cell according to Comparative example 9 was manufactured by the same method as that of Comparative example 5 except that $LiNi_{0.8}Mn_{0.1}Co_{0.1}O_2$ was used as the positive electrode active material.

Comparative Example 10

A battery cell according to Comparative example 10 was manufactured by the same method as that of Comparative example 6 except that $LiNi_{0.8}Mn_{0.1}Co_{0.1}O_2$ was used as the positive electrode active material.

In regard to the positive electrodes and negative electrodes used in Examples 46 to 86 and Comparative examples 5 to 10, the reflectance Rc2 of the surface of the positive electrode active material layer at a wavelength of 550 nm and the reflectance Ra of the surface of the negative electrode active material layer at a wavelength of 550 nm were measured using the same method as that of Example 44, and the ratio Rc2/Ra was calculated. In addition, the density dc2, the supporting quantity Lc2 per unit area, and the porosity Pc2 of the positive electrode active material layer were measured by the same method as that of Example 45. The results are shown in Table 2 in addition to the results in Example 45.

Example 95

(Manufacture of Positive Electrode)

The following components were weighed: 88 parts by weight of $LiFePO_4$ as the positive electrode active material, 6.0 parts by weight of PVDF (HSV-800) as the binder, and 6.0 parts by weight of carbon black (Super-P) as the conductive auxiliary agent. These components were diffused in N-methyl-2-pyrrolidone (NMP) as the solvent; thus, slurry was prepared. The obtained slurry was applied on a 15-μm-thick aluminum foil and dried at 120° C. for 30 minutes, so that the solvent was removed. After that, the aluminum foil was pressed with a linear pressure of 1200 kgf/cm using a roll pressing machine in which a roller for pressing was heated at 71° C. The pressing was followed by air-cooling, and this process is regarded as one cycle of pressing process; here, three cycles of the pressing process were performed. After that, the pressed aluminum foil was punched into an electrode size of 18 mm×22 mm using a die, and thus, the positive electrode for a lithium ion secondary battery was manufactured.

The reflectance Rc3, at a wavelength of 550 nm, of the surface of the positive electrode active material layer in the positive electrode obtained in this manner was measured using the spectrophotometer (made by Konica Minolta, Inc., SPECTRO PHOTOMETER CM-5). The measurement was performed three times and the average value thereof was used as the measurement value. The reflectance Rc3 of the positive electrode active material layer obtained in this manner was 2.0%.

The obtained positive electrode was cut into a square of 10 cm², and the density dc3, the supporting quantity Lc3 per unit area, and the porosity Pc3 of the positive electrode active material layer were calculated. The results indicate that dc3=2.00 g/cm³, Lc3=9.8 mg/cm², and Pc3=23.0%.

A battery cell according to Example 95 was manufactured by the same method as that of Example 1 except that the aforementioned above positive electrode was used. The ratio of Rc3 to the reflectance Ra of the surface of the negative electrode active material layer at a wavelength of 550 nm, Rc3/Ra, was 0.25.

Example 96

A battery cell according to Example 96 was manufactured by the same method as that of Example 95 except that the roller for pressing in the pressing process was heated at 78° C. in the manufacture of the positive electrode.

Example 97

A battery cell according to Example 97 was manufactured by the same method as that of Example 95 except that the roller for pressing in the pressing process was heated at 81° C. in the manufacture of the positive electrode.

Example 98

A battery cell according to Example 98 was manufactured by the same method as that of Example 95 except that the roller for pressing in the pressing process was heated at 87° C. in the manufacture of the positive electrode.

Example 99

A battery cell according to Example 99 was manufactured by the same method as that of Example 95 except that the roller for pressing in the pressing process was set to 95° C. in the manufacture of the positive electrode.

Example 100

A battery cell according to Example 100 was manufactured by the same method as that of Example 95 except that the roller for pressing in the pressing process was set to 95° C. and the number of times of pressing was set to five cycles in the manufacture of the positive electrode.

Example 101

A battery cell according to Example 101 was manufactured by the same method as that of Example 95 except that the roller for pressing in the pressing process was set to 108° C. and the number of times of pressing was set to five cycles in the manufacture of the positive electrode.

Example 102

A battery cell according to Example 102 was manufactured by the same method as that of Example 97 except that the linear pressure in the pressing process was set to 900 kgf/cm in the manufacture of the positive electrode.

Example 103

A battery cell according to Example 103 was manufactured by the same method as that of Example 97 except that the linear pressure in the pressing process was set to 1000 kgf/cm in the manufacture of the positive electrode.

Example 104

A battery cell according to Example 104 was manufactured by the same method as that of Example 97 except that the linear pressure in the pressing process was set to 1500 kgf/cm in the manufacture of the positive electrode.

Example 105

A battery cell according to Example 105 was manufactured by the same method as that of Example 97 except that the linear pressure in the pressing process was set to 1800 kgf/cm in the manufacture of the positive electrode.

Example 106

A battery cell according to Example 106 was manufactured by the same method as that of Example 97 except that the quantity of slurry that was applied was adjusted so that the supporting quantity Lc3 per unit area became 7.7 mg/cm$^2$ in the manufacture of the positive electrode. The result of measuring the supporting quantity Lc3 of the manufactured positive electrode per unit area was 7.8 mg/cm$^2$.

Example 107

A battery cell according to Example 107 was manufactured by the same method as that of Example 97 except that the quantity of slurry that was applied was adjusted so that the supporting quantity Lc3 per unit area became 8.0 mg/cm$^2$ in the manufacture of the positive electrode. The result of measuring the supporting quantity Lc3 of the manufactured positive electrode per unit area was 8.0 mg/cm$^2$.

Example 108

A battery cell according to Example 108 was manufactured by the same method as that of Example 97 except that the quantity of slurry that was applied was adjusted so that the supporting quantity Lc3 per unit area became 12.0 mg/cm$^2$ in the manufacture of the positive electrode. The result of measuring the supporting quantity Lc3 of the manufactured positive electrode per unit area was 12.1 mg/cm$^2$.

Example 109

A battery cell according to Example 109 was manufactured by the same method as that of Example 97 except that the quantity of slurry that was applied was adjusted so that the supporting quantity Lc3 per unit area became 14.8 mg/cm$^2$ in the manufacture of the positive electrode. The result of measuring the supporting quantity Lc3 of the manufactured positive electrode per unit area was 15.0 mg/cm$^2$.

Example 110

A battery cell according to Example 110 was manufactured by the same method as that of Example 97 except that the quantity of slurry that was applied was adjusted so that the supporting quantity Lc3 per unit area became 15.5 mg/cm$^2$ in the manufacture of the positive electrode. The result of measuring the supporting quantity Lc3 of the manufactured positive electrode per unit area was 15.3 mg/cm$^2$.

Example 111

A battery cell according to Example 111 was manufactured by the same method as that of Example 97 except that the negative electrode manufactured in Example 21 was used.

Example 112

A battery cell according to Example 112 was manufactured by the same method as that of Example 97 except that the negative electrode manufactured in Example 22 was used.

Example 113

A battery cell according to Example 113 was manufactured by the same method as that of Example 97 except that the negative electrode manufactured in Example 23 was used.

Example 114

A battery cell according to Example 114 was manufactured by the same method as that of Example 97 except that the negative electrode manufactured in Example 24 was used.

Example 115

A battery cell according to Example 115 was manufactured by the same method as that of Example 97 except that the negative electrode manufactured in Example 25 was used.

Example 116

A battery cell according to Example 116 was manufactured by the same method as that of Example 97 except that the negative electrode manufactured in Example 26 was used.

Example 117

A battery cell according to Example 117 was manufactured by the same method as that of Example 97 except that the negative electrode manufactured in Example 27 was used.

Example 118

A battery cell according to Example 118 was manufactured by the same method as that of Example 95 except that the negative electrode manufactured in Example 28 was used.

Example 119

A battery cell according to Example 119 was manufactured by the same method as that of Example 95 except that $LiFe_{0.4}Mn_{0.6}PO_4$ was used as the positive electrode active material.

Example 120

A battery cell according to Example 120 was manufactured by the same method as that of Example 96 except that LiFe$_{0.4}$Mn$_{0.6}$PO$_4$ was used as the positive electrode active material.

Example 121

A battery cell according to Example 121 was manufactured by the same method as that of Example 97 except that LiFe$_{0.4}$Mn$_{0.6}$PO$_4$ was used as the positive electrode active material.

Example 122

A battery cell according to Example 122 was manufactured by the same method as that of Example 98 except that LiFe$_{0.4}$Mn$_{0.6}$PO$_4$ was used as the positive electrode active material.

Example 123

A battery cell according to Example 123 was manufactured by the same method as that of Example 99 except that LiFe$_{0.4}$Mn$_{0.6}$PO$_4$ was used as the positive electrode active material.

Example 124

A battery cell according to Example 124 was manufactured by the same method as that of Example 95 except that LiVOPO$_4$ was used as the positive electrode active material.

Example 125

A battery cell according to Example 125 was manufactured by the same method as that of Example 96 except that LiVOPO$_4$ was used as the positive electrode active material.

Example 126

A battery cell according to Example 126 was manufactured by the same method as that of Example 97 except that LiVOPO$_4$ was used as the positive electrode active material.

Example 127

A battery cell according to Example 127 was manufactured by the same method as that of Example 98 except that LiVOPO$_4$ was used as the positive electrode active material.

Example 128

A battery cell according to Example 128 was manufactured by the same method as that of Example 99 except that LiVOPO$_4$ was used as the positive electrode active material.

Example 129

A battery cell according to Example 129 was manufactured by the same method as that of Example 97 except that silicon oxide was used as the negative electrode active material.

Example 130

A battery cell according to Example 130 was manufactured by the same method as that of Example 97 except that lithium titanate (Li$_4$Ti$_5$O$_{12}$) was used as the negative electrode active material.

Example 131

A battery cell according to Example 131 was manufactured by the same method as that of Example 97 except that a mixture of 48 parts by mass of graphite powder and 48 parts by mass of silicon oxide was used as the negative electrode active material.

Example 132

A battery cell according to Example 132 was manufactured by the same method as that of Example 97 except that a mixture containing EC, PC, and EMC at a volume ratio of EC:PC:EMC=20:10:70 was used as the nonaqueous solvent of the nonaqueous electrolyte solution.

Example 133

A battery cell according to Example 133 was manufactured by the same method as that of Example 97 except that a mixture containing EC, PC, and EMC at a volume ratio of EC:PC:EMC=30:10:60 was used as the nonaqueous solvent of the nonaqueous electrolyte solution.

Example 134

A battery cell according to Example 134 was manufactured by the same method as that of Example 97 except that a mixture containing EC, PC, and EMC at a volume ratio of EC:PC:EMC=20:20:60 was used as the nonaqueous solvent of the nonaqueous electrolyte solution.

Example 135

A battery cell according to Example 135 was manufactured by the same method as that of Example 97 except that a mixture containing EC and EMC at a volume ratio of EC:EMC=30:70 was used as the nonaqueous solvent of the nonaqueous electrolyte solution.

Example 136

A battery cell according to Example 136 was manufactured by the same method as that of Example 97 except that a mixture containing EC and EMC at a volume ratio of EC:EMC=20:80 was used as the nonaqueous solvent of the nonaqueous electrolyte solution.

Example 137

A battery cell according to Example 137 was manufactured by the same method as that of Example 97 except that a mixture containing EC and EMC at a volume ratio of EC:EMC=10:90 was used as the nonaqueous solvent of the nonaqueous electrolyte solution.

Example 138

A battery cell according to Example 138 was manufactured by the same method as that of Example 97 except that a mixture containing EC, PC, and EMC at a volume ratio of EC:PC:EMC=40:10:50 was used as the nonaqueous solvent of the nonaqueous electrolyte solution.

Example 139

A battery cell according to Example 139 was manufactured by the same method as that of Example 97 except that a mixture containing FEC, PC, and EMC at a volume ratio of FEC:PC:EMC=10:10:80 was used as the nonaqueous solvent of the nonaqueous electrolyte solution.

Comparative Example 11

A battery cell according to Comparative example 11 was manufactured by the same method as that of Example 95 except that the roller for pressing in the pressing process was heated at 35° C. in the manufacture of the positive electrode.

Comparative Example 12

A battery cell according to Comparative example 12 was manufactured by the same method as that of Example 95 except that the roller for pressing in the pressing process was heated at 100° C. and the number of times of pressing was set to five cycles in the manufacture of the positive electrode.

Comparative Example 13

A battery cell according to Comparative example 13 was manufactured by the same method as that of Comparative example 11 except that $LiFe_{0.4}Mn_{0.6}PO_4$ was used as the positive electrode active material.

Comparative Example 14

A battery cell according to Comparative example 14 was manufactured by the same method as that of Comparative example 12 except that $LiFe_{0.4}Mn_{0.6}PO_4$ was used as the positive electrode active material.

Comparative Example 15

A battery cell according to Comparative example 15 was manufactured by the same method as that of Comparative example 11 except that $LiVOPO_4$ was used as the positive electrode active material.

Comparative Example 16

A battery cell according to Comparative example 16 was manufactured by the same method as that of Comparative example 12 except that $LiVOPO_4$ was used as the positive electrode active material.

In regard to the positive electrodes and negative electrodes used in Examples 96 to 131 and Comparative examples 11 to 16, the reflectance Rc3 of the surface of the positive electrode active material layer at a wavelength of 550 nm and the reflectance Ra of the surface of the negative electrode active material layer at a wavelength of 550 nm were measured using the same method as that of Example 95, and the ratio Rc3/Ra was calculated. In addition, the density dc3, the supporting quantity Lc3 per unit area, and the porosity Pc3 of the positive electrode active material layer were measured by the same method as that of Example 95. The results are shown in Table 3 in addition to the results in Example 95.

(Measurement of Charging Rate Characteristic)

The charging rate characteristic of the battery cells according to Examples 1 to 131 and Comparative examples 1 to 16 was measured under the following condition.

First, constant-current charging was performed with a current density of 0.1 C until the voltage reached 4.3 V (vs. Li/Li$^+$). In addition, constant-voltage charging was performed at 4.3 V (vs. Li/Li$^+$) until the current density decreased to 0.05 C.

After the constant-voltage charging ends, the battery cell was left at rest for five minutes. Then, constant-current discharging was performed with a current density of 0.1 C until the voltage became 2.5 V (vs. Li/Li$^+$). This is how the initial charging and discharging were performed.

After the initial charging and discharging, the constant-current charging was performed with a current density of 0.2 C until the voltage became 4.3 V (vs. Li/Li$^+$). Furthermore, the constant-voltage charging was performed at 4.3 V (vs. Li/Li$^+$) until the current density decreased to 0.05 C. After that, the charging capacity at 0.2 C was measured.

After the charging capacity at 0.2 C was measured, the battery cell was left at rest for five minutes. Then, the constant-current discharging was performed with a current density of 0.1 C until the voltage became 2.5 V (vs. Li/Li$^+$). In this manner, the battery cell was discharged.

For the discharged battery cell, the constant-current charging was performed with a current density of 2.0 C until the voltage became 4.3 V (vs. Li/Li$^+$). In addition, the constant-voltage charging was performed at 4.3 V (vs. Li/Li$^+$) until the current density decreased to 0.05 C. After that, the charging capacity at 2.0 C was measured.

The ratio of the charging capacity at 2.0 C to the charging capacity at 0.2 C, which was regarded as the charging rate characteristic, was calculated by the following expression (1), and the charging rate characteristic was evaluated.

$$\text{Charging rate characteristic (\%)} = (\text{charging capacity at 2.0 C/charging capacity at 0.2 C}) \times 100 \quad (1)$$

(Measurement of Load Discharging Characteristic)

The load discharging characteristic of the battery cells according to Examples 1 to 131 and Comparative examples 1 to 16 was measured under the following condition.

First, constant-current charging was performed with a current density of 0.1 C until the voltage reached 4.3 V (vs. Li/Li$^+$). In addition, constant-voltage charging was performed at 4.3 V (vs. Li/Li$^+$) until the current density decreased to 0.05 C.

After the constant-voltage charging ends, the battery cell was left at rest for five minutes. Then, constant-current discharging was performed with a current density of 0.1 C until the voltage became 2.5 V (vs. Li/Li$^+$). This is how the initial charging and discharging were performed.

After the initial charging and discharging, the constant-current charging was performed with a current density of 0.2 C until the voltage became 4.3 V (vs. Li/Li$^+$). Furthermore, the constant-voltage charging was performed at 4.3 V (vs. Li/Li$^+$) until the current density decreased to 0.05 C.

After the charging, the battery cell was left at rest for five minutes. Then, the constant-current discharging was performed with a current density of 0.2 C until the voltage became 2.5 V (vs. Li/Li$^+$). After that, the discharging capacity at 0.2 C was measured.

After the discharging capacity was measured, the battery cell was left at rest for five minutes. Then, for the discharged battery cell, the constant-current charging was performed with a current density of 2.0 C until the voltage became 4.3 V (vs. Li/Li$^+$). In addition, the constant-voltage charging was performed at 4.3 V (vs. Li/Li$^+$) until the current density decreased to 0.05 C.

After the charging, the battery cell was left at rest for five minutes. Then, the constant-current discharging was performed with a current density of 2.0 C until the voltage became 2.5 V (vs. Li/Li$^+$). After that, the charging capacity at 2.0 C was measured.

The ratio of the discharging capacity at 2.0 C to the discharging capacity at 0.2 C, which was regarded as the load discharging characteristic, was calculated by the following expression (2), and the load discharging characteristic was evaluated.

Load discharging characteristic (%)=(discharging capacity at 2.0 C/discharging capacity at 0.2 C)×100  (2)

The results of measuring the charging rate characteristic and the load discharging characteristic of the battery cells according to Examples 1 to 36 and Comparative examples 1 to 4 are shown in Table 1. The results of measuring the charging rate characteristic and the load discharging characteristic of the battery cells according to Examples 45 to 86 and Comparative examples 5 to 10 are shown in Table 2. The results of measuring the charging rate characteristic and the load discharging characteristic of the battery cells according to Examples 95 to 131 and Comparative examples 11 to 16 are shown in Table 3.

TABLE 1

| | Positive electrode active material | Negative electrode active material | Rc (%) | dc (g/cm$^3$) | Lc (mg/cm$^2$) | Pc (%) | Ra (%) | Rc/Ra | Charging rate characteristic (%) | Load discharging characteristic (%) |
|---|---|---|---|---|---|---|---|---|---|---|
| Example 1 | LiCoO$_2$ | Graphite | 8.0 | 3.70 | 14.0 | 23.0 | 7.8 | 1.03 | 85 | 71 |
| Example 2 | LiCoO$_2$ | Graphite | 9.3 | 3.70 | 14.0 | 23.0 | 7.8 | 1.19 | 83 | 72 |
| Example 3 | LiCoO$_2$ | Graphite | 9.5 | 3.70 | 14.0 | 23.0 | 7.8 | 1.22 | 86 | 69 |
| Example 4 | LiCoO$_2$ | Graphite | 10.5 | 3.70 | 14.0 | 23.0 | 7.8 | 1.35 | 85 | 73 |
| Example 5 | LiCoO$_2$ | Graphite | 12.0 | 3.70 | 14.0 | 23.0 | 7.8 | 1.54 | 82 | 68 |
| Example 6 | LiCoO$_2$ | Graphite | 4.1 | 3.70 | 14.0 | 23.0 | 7.8 | 0.53 | 77 | 69 |
| Example 7 | LiCoO$_2$ | Graphite | 2.0 | 3.70 | 14.0 | 23.0 | 7.8 | 0.26 | 78 | 70 |
| Example 8 | LiCoO$_2$ | Graphite | 9.5 | 3.00 | 14.0 | 26.0 | 7.8 | 1.22 | 77 | 70 |
| Example 9 | LiCoO$_2$ | Graphite | 9.5 | 3.10 | 14.0 | 25.0 | 7.8 | 1.22 | 83 | 69 |
| Example 10 | LiCoO$_2$ | Graphite | 9.5 | 3.30 | 14.0 | 24.0 | 7.8 | 1.22 | 86 | 71 |
| Example 11 | LiCoO$_2$ | Graphite | 9.5 | 3.50 | 14.0 | 21.0 | 7.8 | 1.22 | 90 | 68 |
| Example 12 | LiCoO$_2$ | Graphite | 9.5 | 3.90 | 14.0 | 20.0 | 7.8 | 1.22 | 85 | 69 |
| Example 13 | LiCoO$_2$ | Graphite | 9.5 | 4.10 | 14.0 | 20.0 | 7.8 | 1.22 | 83 | 67 |
| Example 14 | LiCoO$_2$ | Graphite | 9.5 | 3.70 | 12.1 | 23.0 | 7.8 | 1.22 | 80 | 70 |
| Example 15 | LiCoO$_2$ | Graphite | 9.5 | 3.70 | 12.8 | 23.0 | 7.8 | 1.22 | 87 | 71 |
| Example 16 | LiCoO$_2$ | Graphite | 9.5 | 3.70 | 15.4 | 23.0 | 7.8 | 1.22 | 85 | 69 |
| Example 17 | LiCoO$_2$ | Graphite | 9.5 | 3.70 | 16.1 | 23.0 | 7.8 | 1.22 | 86 | 72 |
| Example 18 | LiCoO$_2$ | Graphite | 9.5 | 3.70 | 20.1 | 23.0 | 7.8 | 1.22 | 86 | 68 |
| Example 19 | LiCoO$_2$ | Graphite | 9.5 | 3.70 | 25.0 | 23.0 | 7.8 | 1.22 | 83 | 69 |
| Example 20 | LiCoO$_2$ | Graphite | 9.5 | 3.70 | 25.5 | 23.0 | 7.8 | 1.22 | 79 | 71 |
| Example 21 | LiCoO$_2$ | Graphite | 9.5 | 3.70 | 14.0 | 23.0 | 7.3 | 1.30 | 77 | 70 |
| Example 22 | LiCoO$_2$ | Graphite | 9.5 | 3.70 | 14.0 | 23.0 | 7.5 | 1.27 | 86 | 69 |
| Example 23 | LiCoO$_2$ | Graphite | 9.5 | 3.70 | 14.0 | 23.0 | 8.4 | 1.13 | 88 | 69 |
| Example 24 | LiCoO$_2$ | Graphite | 9.5 | 3.70 | 14.0 | 23.0 | 9.5 | 1.00 | 87 | 70 |
| Example 25 | LiCoO$_2$ | Graphite | 9.5 | 3.70 | 14.0 | 23.0 | 9.6 | 0.99 | 82 | 71 |
| Example 26 | LiCoO$_2$ | Graphite | 9.5 | 3.70 | 14.0 | 23.0 | 12.3 | 0.77 | 83 | 70 |
| Example 27 | LiCoO$_2$ | Graphite | 9.5 | 3.70 | 14.0 | 23.0 | 16.0 | 0.59 | 81 | 71 |
| Example 28 | LiCoO$_2$ | Graphite | 8.0 | 3.70 | 14.0 | 23.0 | 8.4 | 0.95 | 80 | 72 |
| Example 29 | LiNi$_{1/3}$Mn$_{1/3}$Co$_{1/3}$O$_2$ | Graphite | 8.0 | 3.70 | 14.0 | 23.0 | 7.8 | 1.03 | 83 | 69 |
| Example 30 | LiNi$_{1/3}$Mn$_{1/3}$Co$_{1/3}$O$_2$ | Graphite | 9.3 | 3.70 | 14.0 | 23.0 | 7.8 | 1.19 | 83 | 69 |
| Example 31 | LiNi$_{1/3}$Mn$_{1/3}$Co$_{1/3}$O$_2$ | Graphite | 9.5 | 3.70 | 14.0 | 23.0 | 7.8 | 1.29 | 90 | 70 |
| Example 32 | LiNi$_{1/3}$Mn$_{1/3}$Co$_{1/3}$O$_2$ | Graphite | 10.5 | 3.70 | 14.0 | 23.0 | 7.8 | 1.38 | 89 | 71 |
| Example 33 | LiNi$_{1/3}$Mn$_{1/3}$Co$_{1/3}$O$_2$ | Graphite | 12.0 | 3.70 | 14.0 | 23.0 | 7.8 | 1.54 | 81 | 72 |
| Example 34 | LiCoO$_2$ | Silicon oxide | 9.5 | 3.70 | 14.0 | 23.0 | 7.8 | 1.29 | 79 | 69 |
| Example 35 | LiCoO$_2$ | Lithium titanate | 9.5 | 3.70 | 14.0 | 23.0 | 7.8 | 1.29 | 83 | 70 |
| Example 36 | LiCoO$_2$ | Graphite + Silicon oxide | 9.5 | 3.70 | 14.0 | 23.0 | 7.8 | 1.29 | 86 | 71 |
| Comparative example 1 | LiCoO$_2$ | Graphite | 1.8 | 3.70 | 14.0 | 23.0 | 7.5 | 0.24 | 65 | 59 |
| Comparative example 2 | LiCoO$_2$ | Graphite | 12.1 | 3.70 | 14.0 | 23.0 | 8.4 | 1.44 | 67 | 58 |
| Comparative example 3 | LiNi$_{1/3}$Mn$_{1/3}$Co$_{1/3}$O$_2$ | Graphite | 1.8 | 3.70 | 14.0 | 23.0 | 7.5 | 0.24 | 64 | 60 |
| Comparative example 4 | LiNi$_{1/3}$Mn$_{1/3}$Co$_{1/3}$O$_2$ | Graphite | 12.1 | 3.70 | 14.0 | 23.0 | 8.4 | 1.44 | 65 | 58 |

As shown by the results in Examples 1 to 7 and Comparative examples 1 and 2 in Table 1, it has been confirmed that the charging rate characteristic and the load discharging characteristic are improved largely by the use of the positive electrode in which the reflectance Rc1 of the surface of the positive electrode active material layer at a wavelength of 550 nm is in the range of 2.0 Rc1≤12.0%.

In addition, as shown by the results in Examples 1 to 5, it has been confirmed that the particularly high charging rate characteristic is achieved when the compound expressed by the general formula (1) is used as the positive electrode active material and the reflectance Rc1 of the surface of the positive electrode active material layer at a wavelength of 550 nm is in the range of 8.0≤Rc1≤12.0%. Furthermore, as shown by the results in Examples 29 to 33 and Comparative examples 3 and 4, it has been confirmed that the similar result is obtained even when the different compound expressed by the general formula (1) is used as the positive electrode active material.

In addition, as shown by the results in Examples 8 to 20, the density dc1 of the positive electrode active material layer, the supporting quantity Lc1 of the positive electrode active material layer, and the porosity Pc1 of the positive electrode active material layer contribute to the charging rate characteristic. The charging rate characteristic is improved particularly when each of these is in the particular range.

In addition, as shown by the results in Examples 21 to 28, it is understood that the lithium ion secondary battery with the high charging rate characteristic can be achieved by controlling the ratio of the reflectance Rc of the surface of the positive electrode active material layer to the reflectance Ra of the surface of the negative electrode active material layer at a wavelength of 550 nm, Rc/Ra, to be within the particular range. Furthermore, as shown by the results in Examples 34 to 36, it is understood that the high charging rate characteristic can be achieved by using the carbon material as the negative electrode active material.

After the charging rate characteristic and the load discharging characteristic of the battery cells in Examples 1 to 36 and Comparative examples 1 to 4 were evaluated, each battery cell was disassembled in a glove box with an argon atmosphere, and then the positive electrode and the negative electrode were extracted. The extracted positive electrode and negative electrode were cleaned using dimethyl carbonate and dried. After the drying, the reflectance Rc1 of the surface of the positive electrode active material layer at a wavelength of 550 nm and the reflectance Ra of the surface of the negative electrode active material layer at a wavelength of 550 nm were measured. As a result, it has been confirmed that the reflectance Rc1 and the reflectance Ra of each battery cell both remained the same before and after the evaluation.

TABLE 2

| | Positive electrode active material | Negative electrode active material | Rc2 (%) | dc2 (g/cm$^3$) | Lc2 (mg/cm$^2$) | Pc2 (%) | Ra (%) | Rc2/Ra | Charging rate characteristic (%) | Load discharging characteristic (%) |
|---|---|---|---|---|---|---|---|---|---|---|
| Example 45 | LiNi$_{0.85}$Co$_{0.10}$Al$_{0.05}$O$_2$ | Graphite | 3.5 | 3.3 | 13.0 | 23.0 | 8.0 | 0.44 | 71 | 84 |
| Example 46 | LiNi$_{0.85}$Co$_{0.10}$Al$_{0.05}$O$_2$ | Graphite | 3.9 | 3.3 | 13.0 | 23.0 | 8.0 | 0.49 | 70 | 86 |
| Example 47 | LiNi$_{0.85}$Co$_{0.10}$Al$_{0.05}$O$_2$ | Graphite | 4.3 | 3.3 | 13.0 | 23.0 | 8.0 | 0.54 | 72 | 85 |
| Example 48 | LiNi$_{0.85}$Co$_{0.10}$Al$_{0.05}$O$_2$ | Graphite | 4.7 | 3.3 | 13.0 | 23.0 | 8.0 | 0.59 | 69 | 84 |
| Example 49 | LiNi$_{0.85}$Co$_{0.10}$Al$_{0.05}$O$_2$ | Graphite | 7.8 | 3.3 | 13.0 | 23.0 | 8.0 | 0.98 | 70 | 85 |
| Example 50 | LiNi$_{0.85}$Co$_{0.10}$Al$_{0.05}$O$_2$ | Graphite | 8.0 | 3.3 | 13.0 | 23.0 | 8.0 | 1.00 | 68 | 80 |
| Example 51 | LiNi$_{0.85}$Co$_{0.10}$Al$_{0.05}$O$_2$ | Graphite | 2.0 | 3.3 | 13.0 | 23.0 | 8.0 | 0.25 | 69 | 79 |
| Example 52 | LiNi$_{0.85}$Co$_{0.10}$Al$_{0.05}$O$_2$ | Graphite | 12.0 | 3.3 | 13.0 | 23.0 | 8.0 | 1.50 | 70 | 78 |
| Example 53 | LiNi$_{0.85}$Co$_{0.10}$Al$_{0.05}$O$_2$ | Graphite | 4.3 | 2.9 | 13.0 | 23.0 | 8.0 | 0.54 | 71 | 76 |
| Example 54 | LiNi$_{0.85}$Co$_{0.10}$Al$_{0.05}$O$_2$ | Graphite | 4.3 | 3.0 | 13.0 | 23.0 | 8.0 | 0.54 | 71 | 81 |
| Example 55 | LiNi$_{0.85}$Co$_{0.10}$Al$_{0.05}$O$_2$ | Graphite | 4.3 | 3.2 | 13.0 | 23.0 | 8.0 | 0.54 | 68 | 84 |
| Example 56 | LiNi$_{0.85}$Co$_{0.10}$Al$_{0.05}$O$_2$ | Graphite | 4.3 | 3.6 | 13.0 | 23.0 | 8.0 | 0.54 | 72 | 83 |
| Example 57 | LiNi$_{0.85}$Co$_{0.10}$Al$_{0.05}$O$_2$ | Graphite | 4.3 | 3.8 | 13.0 | 23.0 | 8.0 | 0.54 | 71 | 84 |
| Example 58 | LiNi$_{0.85}$Co$_{0.10}$Al$_{0.05}$O$_2$ | Graphite | 4.3 | 3.9 | 13.0 | 23.0 | 8.0 | 0.54 | 68 | 78 |
| Example 59 | LiNi$_{0.85}$Co$_{0.10}$Al$_{0.05}$O$_2$ | Graphite | 4.3 | 3.3 | 11.0 | 23.0 | 8.0 | 0.54 | 70 | 75 |
| Example 60 | LiNi$_{0.85}$Co$_{0.10}$Al$_{0.05}$O$_2$ | Graphite | 4.3 | 3.3 | 12.2 | 23.0 | 8.0 | 0.54 | 68 | 82 |
| Example 61 | LiNi$_{0.85}$Co$_{0.10}$Al$_{0.05}$O$_2$ | Graphite | 4.3 | 3.3 | 14.9 | 23.0 | 8.0 | 0.54 | 69 | 83 |
| Example 62 | LiNi$_{0.85}$Co$_{0.10}$Al$_{0.05}$O$_2$ | Graphite | 4.3 | 3.3 | 16.0 | 23.0 | 8.0 | 0.54 | 71 | 84 |
| Example 63 | LiNi$_{0.85}$Co$_{0.10}$Al$_{0.05}$O$_2$ | Graphite | 4.3 | 3.3 | 19.8 | 23.0 | 8.0 | 0.54 | 71 | 82 |
| Example 64 | LiNi$_{0.85}$Co$_{0.10}$Al$_{0.05}$O$_2$ | Graphite | 4.3 | 3.3 | 24.0 | 23.0 | 8.0 | 0.54 | 69 | 82 |
| Example 65 | LiNi$_{0.85}$Co$_{0.10}$Al$_{0.05}$O$_2$ | Graphite | 4.3 | 3.3 | 24.4 | 23.0 | 8.0 | 0.54 | 70 | 76 |
| Example 66 | LiNi$_{0.85}$Co$_{0.10}$Al$_{0.05}$O$_2$ | Graphite | 4.3 | 3.3 | 13.0 | 23.0 | 7.3 | 0.59 | 72 | 74 |
| Example 67 | LiNi$_{0.85}$Co$_{0.10}$Al$_{0.05}$O$_2$ | Graphite | 4.3 | 3.3 | 13.0 | 23.0 | 7.5 | 0.57 | 68 | 79 |
| Example 68 | LiNi$_{0.85}$Co$_{0.10}$Al$_{0.05}$O$_2$ | Graphite | 4.3 | 3.3 | 13.0 | 23.0 | 8.4 | 0.51 | 69 | 81 |
| Example 69 | LiNi$_{0.85}$Co$_{0.10}$Al$_{0.05}$O$_2$ | Graphite | 4.3 | 3.3 | 13.0 | 23.0 | 9.0 | 0.48 | 70 | 86 |
| Example 70 | LiNi$_{0.85}$Co$_{0.10}$Al$_{0.05}$O$_2$ | Graphite | 4.3 | 3.3 | 13.0 | 23.0 | 9.5 | 0.45 | 71 | 84 |
| Example 71 | LiNi$_{0.85}$Co$_{0.10}$Al$_{0.05}$O$_2$ | Graphite | 4.3 | 3.3 | 13.0 | 23.0 | 12.3 | 0.35 | 70 | 85 |
| Example 72 | LiNi$_{0.85}$Co$_{0.10}$Al$_{0.05}$O$_2$ | Graphite | 4.3 | 3.3 | 13.0 | 23.0 | 16.0 | 0.27 | 71 | 80 |
| Example 73 | LiNi$_{0.85}$Co$_{0.10}$Al$_{0.05}$O$_2$ | Graphite | 3.5 | 3.3 | 13.0 | 23.0 | 9.5 | 0.37 | 72 | 82 |
| Example 74 | LiNi$_{0.6}$Mn$_{0.2}$Co$_{0.2}$O$_2$ | Graphite | 3.5 | 3.3 | 13.0 | 23.0 | 8.0 | 0.44 | 67 | 85 |
| Example 75 | LiNi$_{0.6}$Mn$_{0.2}$Co$_{0.2}$O$_2$ | Graphite | 3.9 | 3.3 | 13.0 | 23.0 | 8.0 | 0.49 | 69 | 88 |
| Example 76 | LiNi$_{0.6}$Mn$_{0.2}$Co$_{0.2}$O$_2$ | Graphite | 4.3 | 3.3 | 13.0 | 23.0 | 8.0 | 0.54 | 71 | 87 |
| Example 77 | LiNi$_{0.6}$Mn$_{0.2}$Co$_{0.2}$O$_2$ | Graphite | 4.7 | 3.3 | 13.0 | 23.0 | 8.0 | 0.59 | 70 | 90 |
| Example 78 | LiNi$_{0.6}$Mn$_{0.2}$Co$_{0.2}$O$_2$ | Graphite | 7.8 | 3.3 | 13.0 | 23.0 | 8.0 | 0.98 | 71 | 86 |
| Example 79 | LiNi$_{0.8}$Mn$_{0.1}$Co$_{0.1}$O$_2$ | Graphite | 3.5 | 3.3 | 13.0 | 23.0 | 8.0 | 0.44 | 72 | 84 |
| Example 80 | LiNi$_{0.8}$Mn$_{0.1}$Co$_{0.1}$O$_2$ | Graphite | 3.9 | 3.3 | 13.0 | 23.0 | 8.0 | 0.49 | 68 | 89 |
| Example 81 | LiNi$_{0.8}$Mn$_{0.1}$Co$_{0.1}$O$_2$ | Graphite | 4.3 | 3.3 | 13.0 | 23.0 | 8.0 | 0.54 | 69 | 87 |
| Example 82 | LiNi$_{0.8}$Mn$_{0.1}$Co$_{0.1}$O$_2$ | Graphite | 4.7 | 3.3 | 13.0 | 23.0 | 8.0 | 0.59 | 67 | 87 |
| Example 83 | LiNi$_{0.8}$Mn$_{0.1}$Co$_{0.1}$O$_2$ | Graphite | 7.8 | 3.3 | 13.0 | 23.0 | 8.0 | 0.98 | 67 | 85 |
| Example 84 | LiNi$_{0.85}$Co$_{0.10}$Al$_{0.5}$O$_2$ | Silicon oxide | 4.3 | 3.3 | 13.0 | 23.0 | 8.0 | 0.54 | 71 | 75 |
| Example 85 | LiNi$_{0.85}$Co$_{0.10}$Al$_{0.5}$O$_2$ | Lithium titanate | 4.3 | 3.3 | 13.0 | 23.0 | 8.0 | 0.54 | 72 | 73 |
| Example 86 | LiNi$_{0.85}$Co$_{0.10}$Al$_{0.5}$O$_2$ | Graphite + Silicon oxide | 4.3 | 3.3 | 13.0 | 23.0 | 8.0 | 0.54 | 70 | 83 |

TABLE 2-continued

|  | Positive electrode active material | Negative electrode active material | Rc2 (%) | dc2 (g/cm³) | Lc2 (mg/cm²) | Pc2 (%) | Ra (%) | Rc2/Ra | Charging rate characteristic (%) | Load discharging characteristic (%) |
|---|---|---|---|---|---|---|---|---|---|---|
| Comparative example 5 | $LiNi_{0.85}Co_{0.10}Al_{0.5}O_2$ | Graphite | 1.9 | 3.3 | 13.0 | 23.0 | 8.0 | 0.24 | 58 | 64 |
| Comparative example 6 | $LiNi_{0.85}Co_{0.10}Al_{0.5}O_2$ | Graphite | 12.1 | 3.3 | 13.0 | 23.0 | 8.4 | 1.44 | 57 | 66 |
| Comparative example 7 | $LiNi_{0.6}Mn_{0.2}Co_{0.2}O_2$ | Graphite | 1.9 | 3.3 | 13.0 | 23.0 | 7.5 | 0.25 | 59 | 67 |
| Comparative example 8 | $LiNi_{0.6}Mn_{0.2}Co_{0.2}O_2$ | Graphite | 12.1 | 3.3 | 13.0 | 23.0 | 8.4 | 1.44 | 58 | 66 |
| Comparative example 9 | $LiNi_{0.8}Mn_{0.1}Co_{0.1}O_2$ | Graphite | 1.9 | 3.3 | 13.0 | 23.0 | 7.5 | 0.25 | 58 | 64 |
| Comparative example 10 | $LiNi_{0.8}Mn_{0.1}Co_{0.1}O_2$ | Graphite | 12.1 | 3.3 | 13.0 | 23.0 | 8.4 | 1.44 | 57 | 67 |

As shown by the results in Examples 45 to 52 and Comparative examples 5 and 6 in Table 2, it has been confirmed that the charging rate characteristic and the load discharging characteristic are improved largely by the use of the positive electrode in which the reflectance Rc2 of the surface of the positive electrode active material layer at a wavelength of 550 nm is in the range of 2.0≤Rc2≤12.0%.

In addition, as shown by the results in Examples 45 to 50, it has been confirmed that the particularly high load discharging characteristic is achieved when the compound expressed by the general formula (2) is used as the positive electrode active material and the reflectance Rc2 of the surface of the positive electrode active material layer at a wavelength of 550 nm is in the range of 3.5≤Rc2≤7.8%. Furthermore, as shown by the results in Examples 74 to 83 and Comparative examples 7 to 10, it has been confirmed that the similar result is obtained even when the different compound expressed by the general formula (2) is used as the positive electrode active material.

In addition, as shown by the results in Examples 53 to 65, it is understood that the density dc2 of the positive electrode active material layer, the supporting quantity Lc2 of the positive electrode active material layer, and the porosity Pc2 of the positive electrode active material layer contribute to the load discharging characteristic. Additionally, it is understood that the load discharging characteristic is improved particularly when each of these is in the particular range.

In addition, as shown by the results in Examples 66 to 73, it is understood that the lithium ion secondary battery with the high load discharging characteristic can be obtained by controlling the ratio of the reflectance Rc of the surface of the positive electrode active material layer to the reflectance Ra of the surface of the negative electrode active material layer at a wavelength of 550 nm, Rc/Ra, to be within the particular range. Furthermore, as shown by the results in Examples 84 to 86, it is understood that the high load discharging characteristic can be achieved by using the carbon material as the negative electrode active material.

After the charging rate characteristic and the load discharging characteristic of the battery cells in Examples 45 to 86 and Comparative examples 5 to 10 were evaluated, each battery cell was disassembled in a glove box with an argon atmosphere, and then the positive electrode and the negative electrode were extracted. The extracted positive electrode and negative electrode were cleaned using dimethyl carbonate and dried. After the drying, the reflectance Rc2 of the surface of the positive electrode active material layer at a wavelength of 550 nm and the reflectance Ra of the surface of the negative electrode active material layer at a wavelength of 550 nm were measured. As a result, it has been confirmed that the reflectance Rc2 and the reflectance Ra of each battery cell both remained the same before and after the evaluation.

TABLE 3

|  | Positive electrode active material | Negative electrode active material | Rc3 (%) | dc3 (g/cm³) | Lc3 (mg/cm²) | Pc3 (%) | Ra (%) | Rc3/Ra | Charging rate characteristic (%) | Load discharging characteristic (%) |
|---|---|---|---|---|---|---|---|---|---|---|
| Example 95 | $LiFePO_4$ | Graphite | 2.0 | 2.0 | 9.8 | 23.0 | 8.0 | 0.25 | 65 | 84 |
| Example 96 | $LiFePO_4$ | Graphite | 3.1 | 2.0 | 9.8 | 23.0 | 8.0 | 0.39 | 66 | 83 |
| Example 97 | $LiFePO_4$ | Graphite | 4.8 | 2.0 | 9.8 | 23.0 | 8.0 | 0.60 | 64 | 84 |
| Example 98 | $LiFePO_4$ | Graphite | 5.8 | 2.0 | 9.8 | 23.0 | 8.0 | 0.73 | 68 | 82 |
| Example 99 | $LiFePO_4$ | Graphite | 6.0 | 2.0 | 9.8 | 23.0 | 8.0 | 0.75 | 66 | 74 |
| Example 100 | $LiFePO_4$ | Graphite | 9.9 | 2.0 | 9.8 | 23.0 | 8.0 | 1.24 | 64 | 75 |
| Example 101 | $LiFePO_4$ | Graphite | 12.0 | 2.0 | 9.8 | 23.0 | 8.0 | 1.50 | 65 | 75 |
| Example 102 | $LiFePO_4$ | Graphite | 4.8 | 1.7 | 9.8 | 23.0 | 8.0 | 0.54 | 66 | 80 |
| Example 103 | $LiFePO_4$ | Graphite | 4.8 | 1.8 | 9.8 | 23.0 | 8.0 | 0.60 | 66 | 83 |
| Example 104 | $LiFePO_4$ | Graphite | 4.8 | 2.5 | 9.8 | 23.0 | 8.0 | 0.60 | 67 | 84 |
| Example 105 | $LiFePO_4$ | Graphite | 4.8 | 2.6 | 9.8 | 23.0 | 8.0 | 0.60 | 62 | 79 |
| Example 106 | $LiFePO_4$ | Graphite | 4.8 | 2.0 | 7.8 | 23.0 | 8.0 | 0.60 | 65 | 78 |
| Example 107 | $LiFePO_4$ | Graphite | 4.8 | 2.0 | 8.0 | 23.0 | 8.0 | 0.60 | 64 | 82 |
| Example 108 | $LiFePO_4$ | Graphite | 4.8 | 2.0 | 12.1 | 23.0 | 8.0 | 0.60 | 66 | 84 |
| Example 109 | $LiFePO_4$ | Graphite | 4.8 | 2.0 | 15.0 | 23.0 | 8.0 | 0.60 | 65 | 83 |
| Example 110 | $LiFePO_4$ | Graphite | 4.8 | 2.0 | 15.3 | 23.0 | 8.0 | 0.60 | 64 | 80 |
| Example 111 | $LiFePO_4$ | Graphite | 4.8 | 2.0 | 9.8 | 23.0 | 7.3 | 0.66 | 67 | 79 |
| Example 112 | $LiFePO_4$ | Graphite | 4.8 | 2.0 | 9.8 | 23.0 | 7.5 | 0.64 | 66 | 82 |
| Example 113 | $LiFePO_4$ | Graphite | 4.8 | 2.0 | 9.8 | 23.0 | 8.4 | 0.57 | 64 | 84 |
| Example 114 | $LiFePO_4$ | Graphite | 4.8 | 2.0 | 9.8 | 23.0 | 9.0 | 0.53 | 65 | 84 |

TABLE 3-continued

|  | Positive electrode active material | Negative electrode active material | Rc3 (%) | dc3 (g/cm³) | Lc3 (mg/cm²) | Pc3 (%) | Ra (%) | Rc3/Ra | Charging rate characteristic (%) | Load discharging characteristic (%) |
|---|---|---|---|---|---|---|---|---|---|---|
| Example 115 | LiFePO$_4$ | Graphite | 4.8 | 2.0 | 9.8 | 23.0 | 9.5 | 0.51 | 66 | 85 |
| Example 116 | LiFePO$_4$ | Graphite | 4.8 | 2.0 | 9.8 | 23.0 | 12.3 | 0.39 | 67 | 80 |
| Example 117 | LiFePO$_4$ | Graphite | 4.8 | 2.0 | 9.8 | 23.0 | 16.0 | 0.30 | 63 | 79 |
| Example 118 | LiFePO$_4$ | Graphite | 4.8 | 2.0 | 9.8 | 23.0 | 9.5 | 0.51 | 68 | 80 |
| Example 119 | LiFe$_{0.4}$Mn$_{0.6}$PO$_4$ | Graphite | 2.0 | 2.0 | 9.8 | 23.0 | 8.0 | 0.25 | 66 | 85 |
| Example 120 | LiFe$_{0.4}$Mn$_{0.6}$PO$_4$ | Graphite | 3.1 | 2.0 | 9.8 | 23.0 | 8.0 | 0.39 | 64 | 85 |
| Example 121 | LiFe$_{0.4}$Mn$_{0.6}$PO$_4$ | Graphite | 4.8 | 2.0 | 9.8 | 23.0 | 8.0 | 0.60 | 65 | 84 |
| Example 122 | LiFe$_{0.4}$Mn$_{0.6}$PO$_4$ | Graphite | 5.8 | 2.0 | 9.8 | 23.0 | 8.0 | 0.73 | 66 | 83 |
| Example 123 | LiFe$_{0.4}$Mn$_{0.6}$PO$_4$ | Graphite | 6.0 | 2.0 | 9.8 | 23.0 | 8.0 | 0.75 | 63 | 79 |
| Example 124 | LiVOPO$_4$ | Graphite | 2.0 | 2.0 | 9.8 | 23.0 | 8.0 | 0.25 | 66 | 74 |
| Example 125 | LiVOPO$_4$ | Graphite | 3.1 | 2.0 | 9.8 | 23.0 | 8.0 | 0.39 | 67 | 75 |
| Example 126 | LiVOPO$_4$ | Graphite | 4.8 | 2.0 | 9.8 | 23.0 | 8.0 | 0.60 | 64 | 73 |
| Example 127 | LiVOPO$_4$ | Graphite | 5.8 | 2.0 | 9.8 | 23.0 | 8.0 | 0.73 | 66 | 73 |
| Example 128 | LiVOPO$_4$ | Graphite | 6.0 | 2.0 | 9.8 | 23.0 | 8.0 | 0.75 | 64 | 70 |
| Example 129 | LiFePO$_4$ | Silicon oxide | 2.0 | 2.0 | 9.8 | 23.0 | 8.0 | 0.54 | 65 | 79 |
| Example 130 | LiFePO$_4$ | Lithium titanate | 2.0 | 2.0 | 9.8 | 23.0 | 8.0 | 0.54 | 67 | 78 |
| Example 131 | LiFePO$_4$ | Graphite + Silicon oxide | 2.0 | 2.0 | 9.8 | 23.0 | 8.0 | 0.54 | 68 | 84 |
| Comparative example 11 | LiFePO$_4$ | Graphite | 1.9 | 2.0 | 9.8 | 23.0 | 8.0 | 0.24 | 56 | 65 |
| Comparative example 12 | LiFePO$_4$ | Graphite | 12.1 | 2.0 | 9.8 | 23.0 | 8.0 | 1.51 | 55 | 62 |
| Comparative example 13 | LiFe$_{0.4}$Mn$_{0.6}$PO$_4$ | Graphite | 19 | 2.0 | 9.8 | 23.0 | 8.0 | 0.24 | 57 | 63 |
| Comparative example 14 | LiFe$_{0.4}$Mn$_{0.6}$PO$_4$ | Graphite | 12.1 | 2.0 | 9.8 | 23.0 | 8.0 | 1.51 | 57 | 62 |
| Comparative example 15 | LiVOPO$_4$ | Graphite | 1.9 | 2.0 | 9.8 | 23.0 | 8.0 | 0.24 | 53 | 59 |
| Comparative example 16 | LiVOPO$_4$ | Graphite | 12.1 | 2.0 | 9.8 | 23.0 | 8.0 | 1.51 | 56 | 57 |

As shown by the results in Examples 95 to 101 and Comparative examples 11 and 12 in Table 3, it has been confirmed that the charging rate characteristic and the load discharging characteristic are improved largely by the use of the positive electrode in which the reflectance Rc3 of the surface of the positive electrode active material layer at a wavelength of 550 nm is in the range of 2.0≤Rc3≤12.0%.

In addition, as shown by the results in Examples 95 to 98, it has been confirmed that the particularly high load discharging characteristic is achieved when the compound expressed by the general formula (3) is used as the positive electrode active material and the reflectance Rc3 of the surface of the positive electrode active material layer at a wavelength of 550 nm is in the range of 2.0≤Rc3≤5.8%. Furthermore, as shown by the results in Examples 119 to 128 and Comparative examples 13 to 16, it has been confirmed that the similar result is obtained even when the different compound expressed by the general formula (3) is used as the positive electrode active material.

In addition, as shown by the results in Examples 102 to 110, it is understood that the density dc3 of the positive electrode active material layer, the supporting quantity Lc3 of the positive electrode active material layer, and the porosity Pc3 of the positive electrode active material layer contribute to the load discharging characteristic. Additionally, it is understood that the load discharging characteristic is improved particularly when each of these is in the particular range.

In addition, as shown by the results in Examples 111 to 118, it is understood that the lithium ion secondary battery with the high load discharging characteristic can be obtained by controlling the ratio of the reflectance Rc3 of the surface of the positive electrode active material layer to the reflectance Ra of the surface of the negative electrode active material layer at a wavelength of 550 nm, Rc3/Ra, to be within the particular range. Furthermore, as shown by the results in Examples 129 to 131, it is understood that the high load discharging characteristic can be achieved by using the carbon material as the negative electrode active material.

After the charging rate characteristic and the load discharging characteristic of the battery cells in Examples 95 to 131 and Comparative examples 11 to 16 were evaluated, each battery cell was disassembled in a glove box with an argon atmosphere, and then the positive electrode and the negative electrode were extracted. The extracted positive electrode and negative electrode were cleaned using dimethyl carbonate and dried. After the drying, the reflectance Rc3 of the surface of the positive electrode active material layer at a wavelength of 550 nm and the reflectance Ra of the surface of the negative electrode active material layer at a wavelength of 550 nm were measured. As a result, it has been confirmed that the reflectance Rc3 and the reflectance Ra of each battery cell both remained the same before and after the evaluation.

TABLE 4

|  | Positive electrode active material | Negative electrode active material | Nonaqueous solvent composition | Charging rate characteristic (%) | Load discharging characteristic (%) |
|---|---|---|---|---|---|
| Example 38 | LiCoO$_2$ | Graphite | EC:PC:EMC = 2:1:7 | 90 | 70 |
| Example 39 | LiCoO$_2$ | Graphite | EC:PC:EMC = 3:1:6 | 88 | 71 |

TABLE 4-continued

|  | Positive electrode active material | Negative electrode active material | Nonaqueous solvent composition | Charging rate characteristic (%) | Load discharging characteristic (%) |
|---|---|---|---|---|---|
| Example 40 | $LiCoO_2$ | Graphite | EC:PC:EMC = 2:2:6 | 87 | 72 |
| Example 41 | $LiCoO_2$ | Graphite | EC:EMC = 3:7 | 82 | 69 |
| Example 42 | $LiCoO_2$ | Graphite | EC:EMC = 2:8 | 83 | 71 |
| Example 43 | $LiCoO_2$ | Graphite | EC:EMC = 1:9 | 84 | 70 |
| Example 44 | $LiCoO_2$ | Graphite | EC:PC:EMC = 4:1:5 | 76 | 65 |
| Example 45 | $LiCoO_2$ | Graphite | FEC:PC:EMC = 1:1:8 | 79 | 64 |
| Example 87 | $LiNi_{0.85}Co_{0.10}Al_{0.05}O_2$ | Graphite | EC:PC:EMC = 2:1:7 | 73 | 85 |
| Example 88 | $LiNi_{0.85}Co_{0.10}Al_{0.05}O_2$ | Graphite | EC:PC:EMC = 3:1:6 | 72 | 83 |
| Example 89 | $LiNi_{0.85}Co_{0.10}Al_{0.05}O_2$ | Graphite | EC:PC:EMC = 2:2:6 | 73 | 82 |
| Example 90 | $LiNi_{0.85}Co_{0.10}Al_{0.05}O_2$ | Graphite | EC:EMC = 3:7 | 71 | 80 |
| Example 91 | $LiNi_{0.85}Co_{0.10}Al_{0.05}O_2$ | Graphite | EC:EMC = 2:8 | 73 | 78 |
| Example 92 | $LiNi_{0.85}Co_{0.10}Al_{0.05}O_2$ | Graphite | EC:EMC = 1:9 | 70 | 79 |
| Example 93 | $LiNi_{0.85}Co_{0.10}Al_{0.05}O_2$ | Graphite | EC:PC:EMC = 4:1:5 | 64 | 72 |
| Example 94 | $LiNi_{0.85}Co_{0.10}Al_{0.05}O_2$ | Graphite | FEC:PC:EMC = 1:1:8 | 65 | 74 |
| Example 132 | $LiFePO_4$ | Graphite | EC:PC:EMC = 2:1:7 | 66 | 85 |
| Example 133 | $LiFePO_4$ | Graphite | EC:PC:EMC = 3:1:6 | 64 | 83 |
| Example 134 | $LiFePO_4$ | Graphite | EC:PC:EMC = 2:2:6 | 65 | 82 |
| Example 135 | $LiFePO_4$ | Graphite | EC:EMC = 3:7 | 66 | 79 |
| Example 136 | $LiFePO_4$ | Graphite | EC:EMC = 2:8 | 63 | 78 |
| Example 137 | $LiFePO_4$ | Graphite | EC:EMC = 1:9 | 65 | 79 |
| Example 138 | $LiFePO_4$ | Graphite | EC:PC:EMC = 4:1:5 | 61 | 71 |
| Example 139 | $LiFePO_4$ | Graphite | FEC:PC:EMC = 1:1:8 | 59 | 74 |

In Table 4, it has been confirmed that the charging rate characteristic and the load discharging characteristic are improved when the nonaqueous solvent contains ethylene carbonate (EC) and the volume ratio of ethylene carbonate in the nonaqueous solvent is in the range of 10 to 30 vol. %. In addition, it has been understood that the charging rate characteristic is improved particularly in Examples 38 to 45 where $LiCoO_2$, which is the compound of the general formula (1), is used. Furthermore, it has been understood that the load discharging characteristic is improved particularly in Examples 87 to 94 and Examples 132 to 139 where $LiNi_{0.85}Co_{0.10}Al_{0.05}O_2$, which is the compound of the general formula (2), or $LiFePO_4$, which is the compound of the general formula (3), is used.

Example 140

A battery cell according to Example 140 was manufactured by the same method as that of Example 7 except that a mixture of 80 mass % of $LiCoO_2$ as a positive electrode active material 1 and 20 mass % of $LiFePO_4$ as a positive electrode active material 2 was used as the positive electrode active material.

Example 141

A battery cell according to Example 141 was manufactured by the same method as that of Example 6 except that a mixture of 80 mass % of $LiCoO_2$ as the positive electrode active material 1 and 20 mass % of $LiFePO_4$ as the positive electrode active material 2 was used as the positive electrode active material.

Example 142

A battery cell according to Example 142 was manufactured by the same method as that of Example 1 except that a mixture of 80 mass % of $LiCoO_2$ as the positive electrode active material 1 and 20 mass % of $LiFePO_4$ as the positive electrode active material 2 was used as the positive electrode active material.

Example 143

A battery cell according to Example 143 was manufactured by the same method as that of Example 2 except that a mixture of 80 mass % of $LiCoO_2$ as the positive electrode active material 1 and 20 mass % of $LiFePO_4$ as the positive electrode active material 2 was used as the positive electrode active material.

Example 144

A battery cell according to Example 144 was manufactured by the same method as that of Example 3 except that a mixture of 80 mass % of $LiCoO_2$ as the positive electrode active material 1 and 20 mass % of $LiFePO_4$ as the positive electrode active material 2 was used as the positive electrode active material.

Example 145

A battery cell according to Example 145 was manufactured by the same method as that of Example 4 except that a mixture of 80 mass % of $LiCoO_2$ as the positive electrode active material 1 and 20 mass % of $LiFePO_4$ as the positive electrode active material 2 was used as the positive electrode active material.

Example 146

A battery cell according to Example 146 was manufactured by the same method as that of Example 5 except that a mixture of 80 mass % of $LiCoO_2$ as the positive electrode active material 1 and 20 mass % of $LiFePO_4$ as the positive electrode active material 2 was used as the positive electrode active material.

Example 147

A battery cell according to Example 147 was manufactured by the same method as that of Example 51 except that a mixture of 80 mass % of $LiNi_{0.8}Mn_{0.1}Co_{0.1}O_2$ as the positive electrode active material 1 and 20 mass % of LiCoO$_2$ as the positive electrode active material 2 was used as the positive electrode active material.

Example 148

A battery cell according to Example 148 was manufactured by the same method as that of Example 45 except that a mixture of 80 mass % of LiNi$_{0.8}$Mn$_{0.1}$Co$_{0.1}$O$_2$ as the positive electrode active material 1 and 20 mass % of LiCoO$_2$ as the positive electrode active material 2 was used as the positive electrode active material.

Example 149

A battery cell according to Example 149 was manufactured by the same method as that of Example 49 except that a mixture of 80 mass % of LiNi$_{0.8}$Mn$_{0.1}$Co$_{0.1}$O$_2$ as the positive electrode active material 1 and 20 mass % of LiCoO$_2$ as the positive electrode active material 2 was used as the positive electrode active material.

Example 150

A battery cell according to Example 150 was manufactured by the same method as that of Example 50 except that a mixture of 80 mass % of LiNi$_{0.8}$Mn$_{0.1}$Co$_{0.1}$O$_2$ as the positive electrode active material 1 and 20 mass % of LiCoO$_2$ as the positive electrode active material 2 was used as the positive electrode active material.

Example 151

A battery cell according to Example 151 was manufactured by the same method as that of Example 150 except that the roller for pressing in the pressing process was set to 109° C. and the number of times of pressing was set to three cycles in the manufacture of the positive electrode.

Example 152

A battery cell according to Example 152 was manufactured by the same method as that of Example 150 except that the roller for pressing in the pressing process was set to 113° C. and the number of times of pressing was set to five cycles in the manufacture of the positive electrode.

Example 153

A battery cell according to Example 153 was manufactured by the same method as that of Example 52 except that a mixture of 80 mass % of LiNi$_{0.8}$Mn$_{0.1}$Co$_{0.1}$O$_2$ as the positive electrode active material 1 and 20 mass % of LiCoO$_2$ as the positive electrode active material 2 was used as the positive electrode active material.

Example 154

A battery cell according to Example 154 was manufactured by the same method as that of Example 95 except that a mixture of 80 mass % of LiFePO$_4$ as the positive electrode active material 1 and 20 mass % of LiCoO$_2$ as the positive electrode active material 2 was used as the positive electrode active material.

Example 155

A battery cell according to Example 155 was manufactured by the same method as that of Example 97 except that a mixture of 80 mass % of LiFePO$_4$ as the positive electrode active material 1 and 20 mass % of LiCoO$_2$ as the positive electrode active material 2 was used as the positive electrode active material.

Example 156

A battery cell according to Example 156 was manufactured by the same method as that of Example 98 except that a mixture of 80 mass % of LiFePO$_4$ as the positive electrode active material 1 and 20 mass % of LiCoO$_2$ as the positive electrode active material 2 was used as the positive electrode active material.

Example 157

A battery cell according to Example 157 was manufactured by the same method as that of Example 99 except that a mixture of 80 mass % of LiFePO$_4$ as the positive electrode active material 1 and 20 mass % of LiCoO$_2$ as the positive electrode active material 2 was used as the positive electrode active material.

Example 158

A battery cell according to Example 158 was manufactured by the same method as that of Example 100 except that a mixture of 80 mass % of LiFePO$_4$ as the positive electrode active material 1 and 20 mass % of LiCoO$_2$ as the positive electrode active material 2 was used as the positive electrode active material.

Example 159

A battery cell according to Example 159 was manufactured by the same method as that of Example 154 except that the roller for pressing in the pressing process was set to 100° C. and the number of times of pressing was set to three cycles in the manufacture of the positive electrode.

Example 160

A battery cell according to Example 160 was manufactured by the same method as that of Example 101 except that a mixture of 80 mass % of LiFePO$_4$ as the positive electrode active material 1 and 20 mass % of LiCoO$_2$ as the positive electrode active material 2 was used as the positive electrode active material.

Comparative Example 17

A battery cell according to Comparative example 17 was manufactured by the same method as that of Comparative example 1 except that a mixture of 80 mass % of LiCoO$_2$ as the positive electrode active material 1 and 20 mass % of LiFePO$_4$ as the positive electrode active material 2 was used as the positive electrode active material.

Comparative Example 18

A battery cell according to Comparative example 18 was manufactured by the same method as that of Comparative example 2 except that a mixture of 80 mass % of LiCoO$_2$ as the positive electrode active material 1 and 20 mass % of LiFePO$_4$ as the positive electrode active material 2 was used as the positive electrode active material.

Comparative Example 19

A battery cell according to Comparative example 19 was manufactured by the same method as that of Comparative example 9 except that a mixture of 80 mass % of $LiNi_{0.8}Mn_{0.1}Co_{0.1}O_2$ as the positive electrode active material 1 and 20 mass % of $LiCoO_2$ as the positive electrode active material 2 was used as the positive electrode active material.

Comparative Example 20

A battery cell according to Comparative example 20 was manufactured by the same method as that of Comparative example 10 except that a mixture of 80 mass % of $LiNi_{0.8}Mn_{0.1}Co_{0.1}O_2$ as the positive electrode active material 1 and 20 mass % of $LiCoO_2$ as the positive electrode active material 2 was used as the positive electrode active material.

Comparative Example 21

A battery cell according to Comparative example 21 was manufactured by the same method as that of Comparative example 11 except that a mixture of 80 mass % of $LiFePO_4$ as the positive electrode active material 1 and 20 mass % of $LiCoO_2$ as the positive electrode active material 2 was used as the positive electrode active material.

Comparative Example 22

A battery cell according to Comparative example 22 was manufactured by the same method as that of Comparative example 12 except that a mixture of 80 mass % of $LiFePO_4$ as the positive electrode active material 1 and 20 mass % of $LiCoO_2$ as the positive electrode active material 2 was used as the positive electrode active material.

In regard to the positive electrodes and negative electrodes used in Examples 140 to 160 and Comparative examples 17 to 22, the reflectance Rc of the surface of the positive electrode active material layer at a wavelength of 550 nm and the reflectance Ra of the surface of the negative electrode active material layer at a wavelength of 550 nm were measured using the same method as that of Example 1, and the ratio Rc/Ra was calculated. In addition, the density dc, the supporting quantity Lc per unit area, and the porosity Pc of the positive electrode active material layer were measured by the same method as that of Example 1. The results are shown in Table 5 in addition to the results in Example 95.

Note that the reflectance Rc of the surface of the positive electrode active material layer at a wavelength of 550 nm and the density dc, the supporting quantity Lc per unit area, and the porosity Pc of the positive electrode active material layer in Table 5 are Rc1, dc1, Lc1, and Pc1, respectively because the compound expressed by the general formula (1) is used as the main component in Examples 140 to 146 and Comparative examples 17 and 18. In addition, in Examples 147 to 153 and Comparative examples 19 and 20, these are Rc2, dc2, Lc2, and Pc2, respectively because the compound expressed by the general formula (2) is used as the main component. Furthermore, in Examples 154 to 160 and Comparative examples 21 and 22, these are Rc3, dc3, Lc3, and Pc3, respectively because the compound expressed by the general formula (3) is used as the main component.

TABLE 5

| | Positive electrode active material 1 | Positive electrode active material 2 | Rc (%) | dc (g/cm³) | Lc (mg/cm²) | Pc (%) | Ra (%) | Rc/Ra | Charging rate characteristic | Load discharging characteristic |
|---|---|---|---|---|---|---|---|---|---|---|
| Example 140 | $LiCoO_2$ | $LiFePO_4$ | 2.0 | 3.7 | 14.0 | 23.0 | 7.8 | 0.26 | 80 | 72 |
| Example 141 | $LiCoO_2$ | $LiFePO_4$ | 4.1 | 3.7 | 14.0 | 23.0 | 7.8 | 0.53 | 79 | 73 |
| Example 142 | $LiCoO_2$ | $LiFePO_4$ | 8.0 | 3.7 | 14.0 | 23.0 | 7.8 | 1.03 | 84 | 68 |
| Example 143 | $LiCoO_2$ | $LiFePO_4$ | 9.3 | 3.7 | 14.0 | 23.0 | 7.8 | 1.19 | 88 | 69 |
| Example 144 | $LiCoO_2$ | $LiFePO_4$ | 9.5 | 3.7 | 14.0 | 23.0 | 7.8 | 1.22 | 87 | 70 |
| Example 145 | $LiCoO_2$ | $LiFePO_4$ | 10.5 | 3.7 | 14.0 | 23.0 | 7.8 | 1.35 | 84 | 69 |
| Example 146 | $LiCoO_2$ | $LiFePO_4$ | 12.0 | 3.7 | 14.0 | 23.0 | 7.8 | 1.54 | 83 | 70 |
| Example 147 | $LiNi_{0.8}Mn_{0.1}Co_{0.1}O_2$ | $LiCoO_2$ | 2.0 | 3.3 | 13.0 | 23.0 | 7.8 | 0.26 | 68 | 82 |
| Example 148 | $LiNi_{0.8}Mn_{0.1}Co_{0.1}O_2$ | $LiCoO_2$ | 3.5 | 3.3 | 13.0 | 23.0 | 7.8 | 0.45 | 67 | 88 |
| Example 149 | $LiNi_{0.8}Mn_{0.1}Co_{0.1}O_2$ | $LiCoO_2$ | 7.8 | 3.3 | 13.0 | 23.0 | 7.8 | 1.00 | 69 | 87 |
| Example 150 | $LiNi_{0.8}Mn_{0.1}Co_{0.1}O_2$ | $LiCoO_2$ | 8.1 | 3.3 | 13.0 | 23.0 | 7.8 | 1.04 | 71 | 84 |
| Example 151 | $LiNi_{0.8}Mn_{0.1}Co_{0.1}O_2$ | $LiCoO_2$ | 9.5 | 3.3 | 13.0 | 23.0 | 7.8 | 1.22 | 73 | 81 |
| Example 152 | $LiNi_{0.8}Mn_{0.1}Co_{0.1}O_2$ | $LiCoO_2$ | 10.5 | 3.3 | 13.0 | 23.0 | 7.8 | 1.35 | 72 | 80 |
| Example 153 | $LiNi_{0.8}Mn_{0.1}Co_{0.1}O_2$ | $LiCoO_2$ | 12.0 | 3.3 | 13.0 | 23.0 | 7.8 | 1.54 | 70 | 79 |
| Example 154 | $LiFePO_4$ | $LiCoO_2$ | 2.0 | 2.0 | 9.8 | 23.0 | 7.8 | 0.26 | 68 | 85 |
| Example 155 | $LiFePO_4$ | $LiCoO_2$ | 4.8 | 2.0 | 9.8 | 23.0 | 7.8 | 0.62 | 67 | 83 |
| Example 156 | $LiFePO_4$ | $LiCoO_2$ | 5.8 | 2.0 | 9.8 | 23.0 | 7.8 | 0.74 | 66 | 87 |
| Example 157 | $LiFePO_4$ | $LiCoO_2$ | 6.1 | 2.0 | 9.8 | 23.0 | 7.8 | 0.78 | 69 | 82 |
| Example 158 | $LiFePO_4$ | $LiCoO_2$ | 9.5 | 2.0 | 9.8 | 23.0 | 7.8 | 1.22 | 73 | 80 |
| Example 159 | $LiFePO_4$ | $LiCoO_2$ | 10.5 | 2.0 | 9.8 | 23.0 | 7.8 | 1.35 | 74 | 81 |
| Example 160 | $LiFePO_4$ | $LiCoO_2$ | 12.0 | 2.0 | 9.8 | 23.0 | 7.8 | 1.54 | 72 | 79 |
| Comparative example 17 | $LiCoO_2$ | $LiFePO_4$ | 1.8 | 3.7 | 14.0 | 23.0 | 7.5 | 0.24 | 65 | 59 |
| Comparative example 18 | $LiCoO_2$ | $LiFePO_4$ | 12.1 | 3.7 | 14.0 | 23.0 | 8.4 | 1.44 | 67 | 58 |
| Comparative example 19 | $LiNi_{0.8}Mn_{0.1}Co_{0.1}O_2$ | $LiCoO_2$ | 1.9 | 3.3 | 13.0 | 23.0 | 7.5 | 0.25 | 58 | 64 |
| Comparative example 20 | $LiNi_{0.8}Mn_{0.1}Co_{0.1}O_2$ | $LiCoO_2$ | 12.1 | 3.3 | 13.0 | 23.0 | 8.4 | 1.44 | 57 | 67 |
| Comparative example 21 | $LiFePO_4$ | $LiCoO_2$ | 1.9 | 2.0 | 9.8 | 23.0 | 8.0 | 0.24 | 56 | 65 |
| Comparative example 22 | $LiFePO_4$ | $LiCoO_2$ | 12.1 | 2.0 | 9.8 | 23.0 | 8.0 | 1.51 | 55 | 62 |

As shown by the results in Examples 140 to 160 and Comparative examples 17 to 22 in Table 5, it has been confirmed that the charging rate characteristic and the load discharging characteristic are excellent in the range of 2.0≤Rc≤12.0% even when the compound expressed by the different general formula is mixed. In addition, as shown by the results in Examples 140 to 147, it has been confirmed that, in the case of using the positive electrode mainly containing the compound expressed by the general formula (1), the high charging rate characteristic is achieved when Rc1 is in the range of 8.0≤Rc1≤12.0% similarly to the results in Table 1. Similarly, it has been confirmed that, in the case of using the positive electrode containing the compound expressed by the general formula (2), the high load discharging characteristic is achieved when Rc2 is in the range of 3.5≤Rc2≤7.8% similarly to the results in Table 2. In addition, it has been confirmed that, in the case of using the positive electrode containing the compound expressed by the general formula (3), the high load discharging characteristic is achieved when Rc3 is in the range of 2.0≤Rc3≤5.8% similarly to the results in Table 3.

Comparing Examples 140 to 146 and Examples 154 to 160 indicates that one of the charging rate characteristic and the load discharging characteristic becomes excellent depending on the compound that is mainly contained in the positive electrode active material. This result shows that the reflectance of the surface of the positive electrode active material layer at a wavelength of 550 nm and the type of compound that is mainly contained in the positive electrode are related with the characteristic to be achieved.

According to the present embodiment, the positive electrode that can improve the charging rate characteristic and the load discharging characteristic, and the lithium ion secondary battery including this positive electrode can be provided. These are suitably used as the power source of mobile electronic devices. Furthermore, these can be used in electric vehicles, or for home-use storage batteries and industrial storage batteries.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A positive electrode comprising:
a positive electrode current collector; and
a positive electrode active material layer disposed on the positive electrode current collector and including:
  a positive electrode active material;
  a conductive auxiliary agent; and
  a binder, wherein:
    an electrolyte solution contacts a surface of the positive electrode active material layer;
    the surface of the positive electrode active material, layer is a pressed surface that includes the positive electrode active material, the conductive auxiliary agent, and the binder, has a reflectance Rc in a range of 2.0≤Rc≤12.0% at a wavelength of 550 nm; and
    the reflectance reflects a flatness of the pressed surface of the positive electrode active material layer.

2. The positive electrode according to claim 1, wherein:
the positive electrode active material contains a compound expressed by the following formula (1) as a main component:

$$Li_xNi_yM_{1-y}O_z \quad (1)$$

where x, y, and z satisfy 0<x≤1.1, 0≤y<0.5, and 1.9≤z≤2.1, and M includes at least one kind selected from Co, Mn, Al, Fe, and Mg; and
the surface of the positive electrode active material layer has a reflectance Rc1 in a range of 8.0≤Rc1≤12.0% at a wavelength of 550 nm.

3. The positive electrode according to claim 2, wherein the positive electrode active material layer has a density dc1 in a range of 3.1≤dc1≤4.1 g/cm³.

4. The positive electrode according to claim 2, wherein the positive electrode active material layer has a supporting quantity Lc1 per unit area in a range of 13.0≤Lc1≤25.0 mg/cm².

5. The positive electrode according to claim 1, wherein:
the positive electrode active material contains a compound expressed by the following formula (2) as a main component:

$$Li_xNi_yM_{1-y}O_z \quad (2)$$

where x, y, and z satisfy 0<x≤1.1, 0.5≤y≤1, and 1.9≤z≤2.1, and M includes at least one kind selected from Co, Mn, Al, Fe, and Mg; and
the surface of the positive electrode active material layer has a reflectance Rc2 in a range of 3.5≤Rc2≤7.8% at a wavelength of 550 nm.

6. The positive electrode according to claim 5, wherein the positive electrode active material layer has a density dc2 in a range of 3.0≤dc2≤3.8 g/cm³.

7. The positive electrode according to claim 5, wherein the positive electrode active material layer has a supporting quantity Lc2 per unit area in a range of 12.0≤Lc2≤24.0 mg/cm².

8. The positive electrode according to claim 1, wherein:
the positive electrode active material contains a compound expressed by the following formula (3) as a main component:

$$Li_xM_yO_zPO_4 \quad (3)$$

where x, y, and z satisfy 0<x≤1.1, 0<y≤1.1, and 0≤z≤1.0, and M includes at least one kind selected from Ni, Co, Mn, Al, Fe, Mg, Ag, and V; and
the surface of the positive electrode active material layer has a reflectance Rc3 in a range of 2.0≤Rc3≤5.8% at a wavelength of 550 nm.

9. The positive electrode according to claim 8, wherein the positive electrode active material layer has a density dc3 in a range of 1.8≤dc3≤2.5 g/cm³.

10. The positive electrode according to claim 8, wherein the positive electrode active material layer has a supporting quantity Lc3 per unit area in a range of 8.0≤Lc3≤15.0 mg/cm².

11. A lithium ion secondary battery comprising:
the positive electrode according to claim 1;
a negative electrode including;
  a negative electrode current collector; and
  a negative electrode active material layer disposed on the negative electrode current collector and including a negative electrode active material, a surface of the negative electrode active material layer having a reflectance Ra in a range of 7.5≤Ra≤16.0% at a wavelength of 550 nm;

a separator; and wherein the electrolyte solution is a nonaqueous electrolyte solution.

12. A lithium ion secondary battery comprising:

the positive electrode according to claim 2;

a negative electrode including:
- a negative electrode current collector; and
- a negative electrode active material layer disposed on the negative electrode current collector and including a negative electrode active material, a surface of the negative electrode active material layer having a reflectance Ra in a range of 7.5≤Ra≤16.0% at a wavelength of 550 nm;

a separator; and wherein the electrolyte solution is a nonaqueous electrolyte solution.

13. The lithium ion secondary battery according to claim 12, wherein a ratio of the reflectance Rc1 to the reflectance Ra, Rc1/Ra, is in a range of 1.00<Rc1/Ra≤1.53.

14. A lithium ion secondary battery comprising:

the positive electrode according to claim 5;

a negative electrode including:
- a negative electrode current collector; and
- a negative electrode active material layer disposed on the negative electrode current collector and including a negative electrode active material, a surface of the negative electrode active material layer having a reflectance Ra in a range of 7.5≤Ra≤16.0% at a wavelength of 550 nm;

a separator; and wherein the electrolyte solution is a nonaqueous electrolyte solution.

15. The lithium ion secondary battery according to claim 14, wherein a ratio of the reflectance Rc2 to the reflectance Ra, Rc2/Ra, is in a range of 0.29≤Rc2/Ra<1.00.

16. A lithium ion secondary battery comprising:

the positive electrode according to claim 8;

a negative electrode including:
- a negative electrode current collector; and
- a negative electrode active material layer disposed on the negative electrode current collector and including a negative electrode active material, a surface of the negative electrode active material layer having a reflectance Ra in a range of 7.5≤Ra≤16.0% at a wavelength of 550 nm;

a separator; and wherein the electrolyte solution is a nonaqueous electrolyte solution.

17. The lithium ion secondary battery according to claim 16, wherein a ratio of the reflectance Rc3 to the reflectance Ra, Rc3/Ra, is in a range of 0.13≤Rc3/Ra≤0.75.

18. The lithium ion secondary battery according to claim 11, wherein the negative electrode active material contains a carbon material with a graphite structure.

19. The lithium ion secondary battery according to claim 11, wherein:
- the nonaqueous electrolyte solution includes a nonaqueous solvent and an electrolyte;
- the nonaqueous solvent contains ethylene carbonate; and
- the ethylene carbonate is contained in a range of 10 to 30 vol. % in the entire nonaqueous solvent.

* * * * *